United States Patent [19]
Burns et al.

[11] Patent Number: 5,745,479
[45] Date of Patent: Apr. 28, 1998

[54] ERROR DETECTION IN A WIRELESS LAN ENVIRONMENT

[75] Inventors: Lawrence M. Burns, Mountain View; Scott Mitchell, San Jose; Bruce Kendall, Sunnyvale, all of Calif.

[73] Assignee: 3COM Corporation, Santa Clara, Calif.

[21] Appl. No.: 394,378

[22] Filed: Feb. 24, 1995

[51] Int. Cl.$^6$ .................................................. H04B 17/00
[52] U.S. Cl. .................. 370/245; 455/226.2; 455/226.4; 455/67.1; 455/67.3; 375/228; 371/5.1
[58] Field of Search ....................... 375/224, 228, 375/226, 227; 370/13, 17, 85.3, 241, 245, 252, 910; 371/20.1, 37.4, 37.7, 5.1, 6; 379/1, 29; 455/67.1, 67.6, 67.7, 226.2, 226.4, 67.3

[56] References Cited

U.S. PATENT DOCUMENTS

| | | |
|---|---|---|
| 4,336,541 | 6/1982 | Tsui et al. . |
| 4,747,101 | 5/1988 | Akaiwa et al. . |
| 4,807,222 | 2/1989 | Amitay . |
| 4,809,257 | 2/1989 | Gantenbein et al. . |
| 4,866,788 | 9/1989 | Mouly et al. . |
| 4,876,742 | 10/1989 | Vacon et al. . |
| 4,918,746 | 4/1990 | Serizawa . |
| 4,967,413 | 10/1990 | Otani .................................. 375/349 |
| 4,975,926 | 12/1990 | Knapp . |
| 5,029,183 | 7/1991 | Tymes . |
| 5,099,346 | 3/1992 | Lee et al. . |
| 5,103,461 | 4/1992 | Tymes . |
| 5,123,029 | 6/1992 | Bantz et al. . |
| 5,142,550 | 8/1992 | Tymes . |
| 5,157,687 | 10/1992 | Tymes . |
| 5,164,942 | 11/1992 | Kamerman et al. . |
| 5,166,929 | 11/1992 | Lo . |
| 5,181,200 | 1/1993 | Harrison . |
| 5,198,805 | 3/1993 | Whiteside et al. . |
| 5,220,564 | 6/1993 | Tuch et al. . |
| 5,231,634 | 7/1993 | Giles et al. . |
| 5,241,690 | 8/1993 | Larsson et al. . |
| 5,276,703 | 1/1994 | Budin et al. . |
| 5,280,498 | 1/1994 | Tymes et al. . |
| 5,339,316 | 8/1994 | Diepstraten . |
| 5,347,536 | 9/1994 | Meehan ............................... 455/226.1 |
| 5,471,671 | 11/1995 | Wang et al. ......................... 455/226.2 |

FOREIGN PATENT DOCUMENTS

| | | |
|---|---|---|
| 0 594 342 A2 | 10/1993 | European Pat. Off. . |
| 0 594 458 A2 | 10/1993 | European Pat. Off. . |

*Primary Examiner*—Wellington Chin
*Assistant Examiner*—Jean B. Corrielus
*Attorney, Agent, or Firm*—Wilson, Sonsini, Goodrich & Rosati

[57] ABSTRACT

An apparatus for detecting errors in a wireless communication channel comprises a receiver which receives a data stream from the wireless communication channel, a signal strength indication circuit coupled with the receiver which indicates signal strength for a received data stream, and processing resources coupled to the signal strength indication circuit which monitors the received data signal strength to detect anomalies in the strength of the received data stream, typical of erroneous data. Also, the system includes a signal phase monitoring circuit coupled with the receiver. This circuit indicates phase of the received data stream. Processing resources coupled with the signal phase monitoring circuit, monitor the received data stream phase to detect anomalies in phase of the received data stream typical of erroneous data. In addition, the data stream will include data packets having error detection codes imbedded within the data packets. Processing resources coupled with the receiver are responsive to the error detection codes to detect errors in the data packets. Thus, an error detection system based on monitoring the amplitude, and the phase of a received signal, combined with digital CRC detection techniques provides an efficient error detection system, capable of detecting interference early in transmission, allowing more rapid recovery in retries.

28 Claims, 25 Drawing Sheets

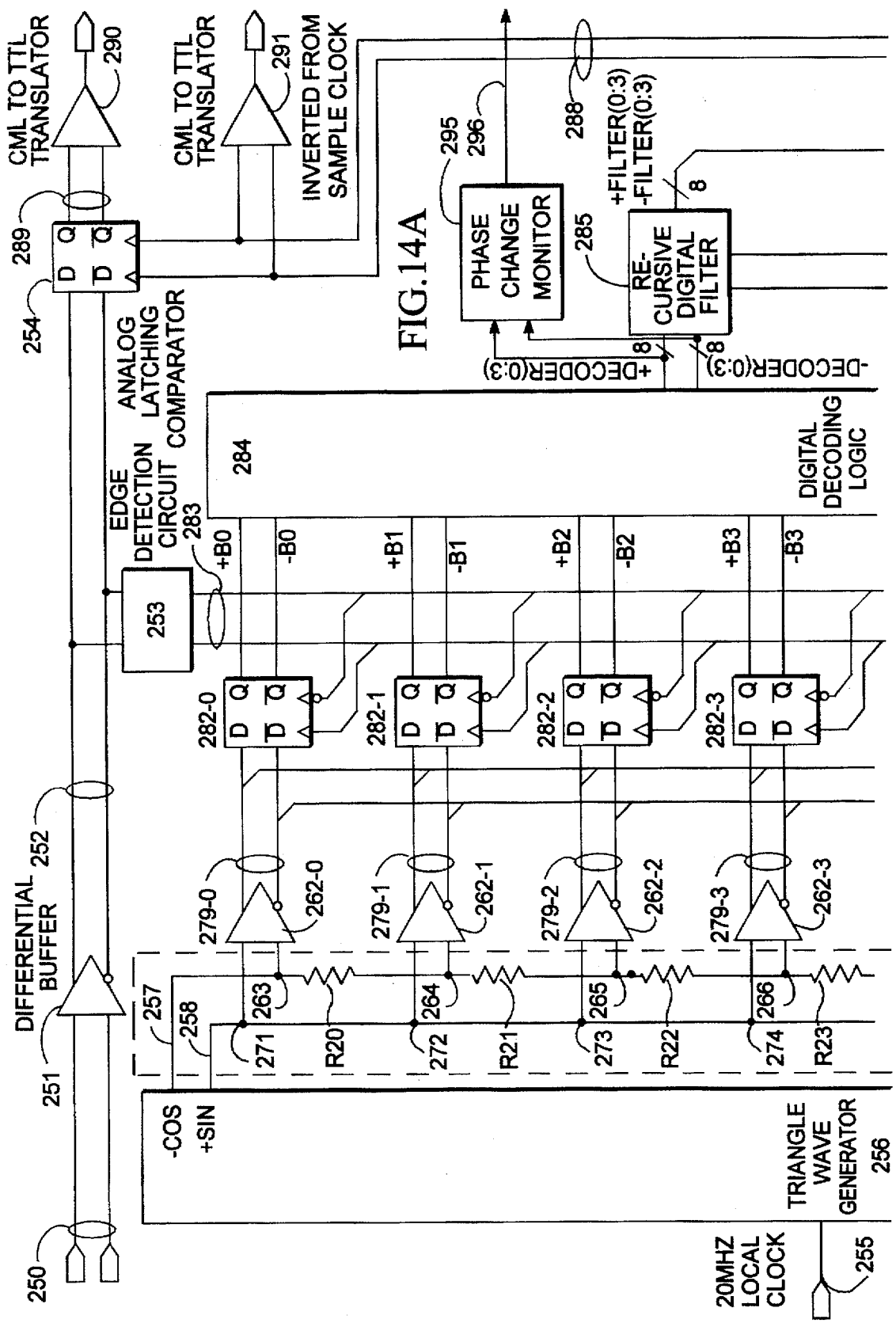

DECODING LOGIC TABLE

| C0 | C1 | C2 | C3 | C4 | C5 | C6 | C7 | B3 | B2 | B1 | B0 |
|----|----|----|----|----|----|----|----|----|----|----|----|
| 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 1 |
| 1 | 1 | 0 | 0 | 0 | 0 | 0 | 0 | 0 | 0 | 1 | 0 |
| 1 | 1 | 1 | 0 | 0 | 0 | 0 | 0 | 0 | 0 | 1 | 1 |
| 1 | 1 | 1 | 1 | 0 | 0 | 0 | 0 | 0 | 1 | 0 | 0 |
| 1 | 1 | 1 | 1 | 1 | 0 | 0 | 0 | 0 | 1 | 0 | 1 |
| 1 | 1 | 1 | 1 | 1 | 1 | 0 | 0 | 0 | 1 | 1 | 0 |
| 1 | 1 | 1 | 1 | 1 | 1 | 1 | 0 | 0 | 1 | 1 | 1 |
| 1 | 1 | 1 | 1 | 1 | 1 | 1 | 1 | 1 | 0 | 0 | 0 |
| 0 | 1 | 1 | 1 | 1 | 1 | 1 | 1 | 1 | 0 | 0 | 1 |
| 0 | 0 | 1 | 1 | 1 | 1 | 1 | 1 | 1 | 0 | 1 | 0 |
| 0 | 0 | 0 | 1 | 1 | 1 | 1 | 1 | 1 | 0 | 1 | 1 |
| 0 | 0 | 0 | 0 | 1 | 1 | 1 | 1 | 1 | 1 | 0 | 0 |
| 0 | 0 | 0 | 0 | 0 | 1 | 1 | 1 | 1 | 1 | 0 | 1 |
| 0 | 0 | 0 | 0 | 0 | 0 | 1 | 1 | 1 | 1 | 1 | 0 |
| 0 | 0 | 0 | 0 | 0 | 0 | 0 | 1 | 1 | 1 | 1 | 1 |

B0 = C0⊕C1⊕C2⊕C3⊕C4⊕C5⊕C6⊕C7
B1 = C1⊕C3⊕C5⊕C7
B2 = C3⊕C7
B3 = C7

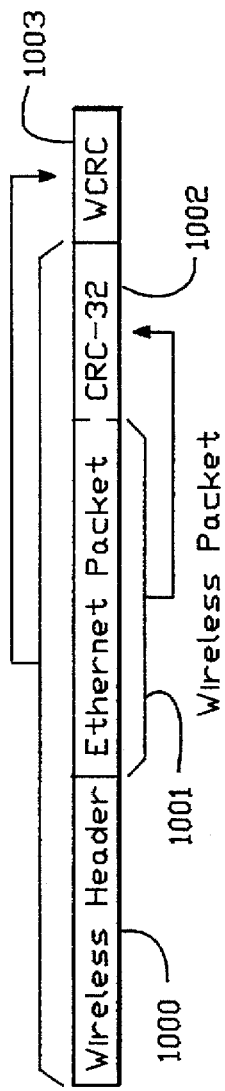
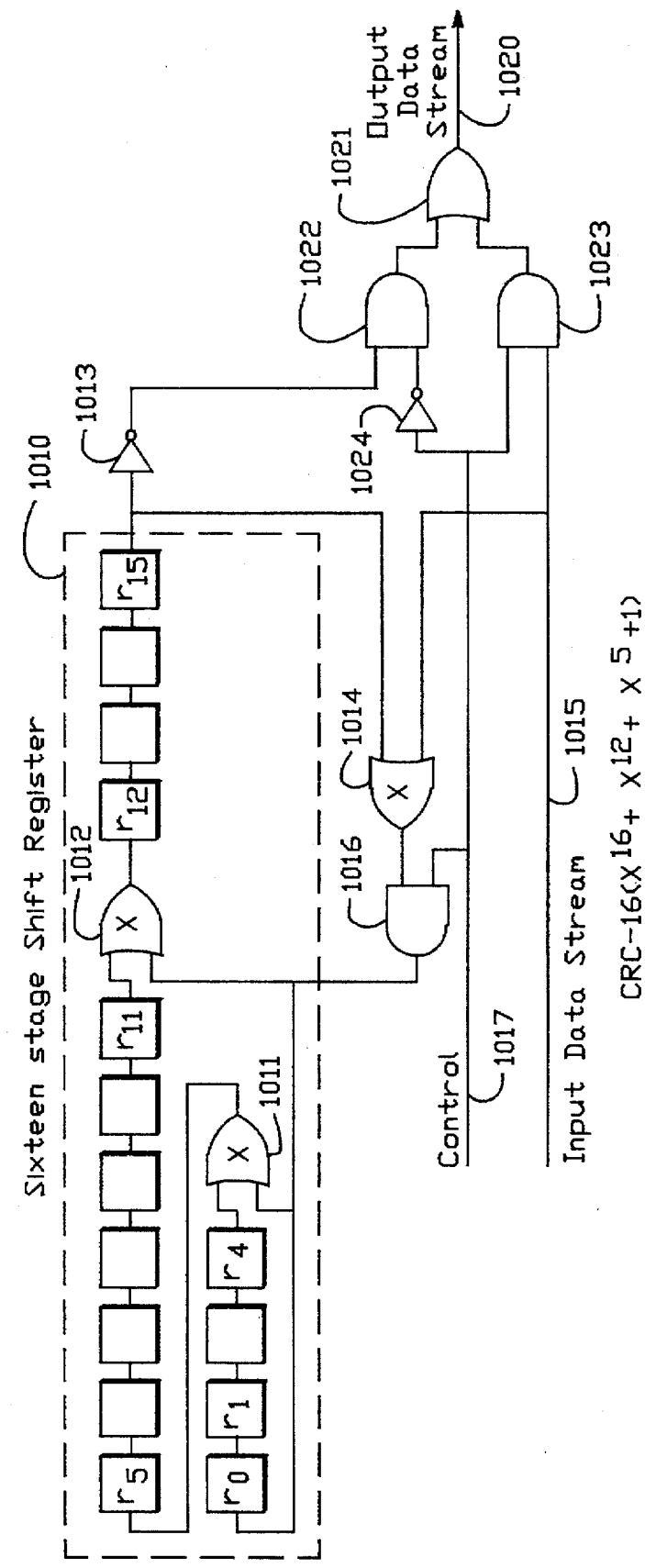
FIG. 25
FIG. 26

ERROR DETECTION IN A WIRELESS LAN ENVIRONMENT

BACKGROUND OF THE INVENTION

1. Field of the Invention

The present invention relates to wireless communication systems; and more particularly to the detection of erroneous transmissions in a wireless environment.

2. Description of Related Art

In all communication systems, errors occur. A variety of techniques have been developed to detect such errors, and when possible to correct them. Thus, for instance, in a standard local area network, such as Ethernet, error detection mechanisms, such as cyclic redundancy codes (CRC) are implemented at various levels of protocol.

In wireless local area networks, the bit error rate of a transmission is effected by a number of factors not present in a classic wired LAN. Thus, the bit error rate of a given transmission depends on the amount of power transmitted, the capability of the receiver to receive that power, in the presence of noise and/or interference, and the quality of the transmission once it gets to the receiver. In addition, there are a number of sources of interference which may be encountered in such systems. For instance, for systems transmitting in the industrial, scientific and medical (ISM) band, around 2.4 GHz, as regulated by the Federal Communications Commissions (FCC) Part 15 Regulations, interference may arise from other sources within the same band, like microwave ovens, security systems and car alarms. Also, additive white gaussian noise thermally generated naturally may be a source of interference. Further, these types of interference may occur even after a user has been allocated a channel for communicating. Thus, a data packet may be corrupted early or late in a transmission sequence. Relying on the standard CRC techniques in local area network packets alone, may be insufficient in these environments. For instance, CRC can detect burst errors up to the length of CRC itself. In wireless environments, burst errors can be significant portions of packet length, entire packets, or multiple packets.

Accordingly, it is desirable to provide a technique for detecting errors in wireless transmissions, which is robust in the presence of a variety of sources of interference or noise.

SUMMARY OF THE INVENTION

The present invention provides an apparatus for detecting errors in a wireless communication channel which comprises a receiver which receives the data stream from the wireless communication channel, a signal strength indication circuit coupled with the receiver which indicates signal strength for a received data stream, and processing resources coupled to the signal strength indication circuit which monitors the received data strength signal to detect anomalies in the strength of the received data stream typical of erroneous data. Also, the system includes a signal phase monitoring circuit coupled with the receiver. This circuit indicates phase of the received data stream. Processing resources coupled with the signal phase monitoring circuit, monitor the received data stream phase to detect anomalies in phase of the received data stream typical of erroneous data. In addition, according to another aspect of the invention, the data stream will include data packets having error detection codes, such as cyclic redundancy codes, imbedded within the data packets. Processing resources coupled with the receiver are responsive to the error detection codes to detect errors in the data packets.

Thus, the present invention provides an error detection system based on monitoring the amplitude, and the phase of a received signal, combined with digital CRC detection techniques. This provides a robust and efficient error detection system, capable of detecting interference early in transmission, allowing more rapid recovery and retries.

According to another aspect of the invention, the system detects errors in a network data packet transmitted in a wireless radio medium as an RF signal modulated in response to the network data packet. The receiver receives the RF signal from the RF medium. Demodulation circuitry coupled with the receiver demodulates the RF signal to recover a serial data stream from the RF signal. The signal strength indication circuit is coupled with the demodulation circuit, and indicates signal strength for the received RF signal. Also, the signal phase monitoring circuit is coupled with the demodulation circuitry.

The demodulation circuitry includes a downconverter, which converts the received data stream frequency down to an intermediate band. A filter coupled with the downconverter, and tuned for the intermediate band, outputs an intermediate band signal. A detector coupled to the filter produces the serial data stream from the intermediate band signal. In this embodiment, the signal strength monitoring circuitry is coupled to the output of the filter, and produces a signal strength indicator signal in response to the amplitude of the intermediate band signal.

The detector outputs the serial data stream in an analog form, such as an analog NRZ data stream. The phase detection circuitry is coupled to receive the serial data stream, and indicates shifts in phase of transitions of the received data stream.

As mentioned above, error detection codes are also imbedded in the wireless communication channel. In one aspect, the invention transmits standard wired LAN packets across a wireless link. In the act of transmission, the standard wired packet format is encapsulated in a wireless format including a wireless header, and a wireless CRC. The receiver includes resources responsive to the wireless CRC for an encapsulated LAN packet to detect errors in the transmission.

In yet another aspect of the invention, the wireless communication channel comprises a wireless link to a standard local area network, such as a Ethernet network. The packets are transmitted in a radio frequency communication band, having a frequency on the order of 2 to 5 GHz. This signal is frequency modulated in response to the encapsulated data packet, using a gaussian filtered minimum shift keying technique, at a data rate of nominally 10 megabits per second or greater. In this aspect, the wireless transmission includes a standard Ethernet packet, having the standard Ethernet CRC code embedded therein. The Ethernet packet is encapsulated in a wireless packet, having a wireless CRC appended. The packet is then transmitted to the receiver, which includes resources for monitoring perturbations in amplitude of the received signal and perturbations in phase of the received signal which are typical of erroneous data. Finally, the receiver includes resources for detecting errors in response to the wireless CRC, and for passing the packet up to the Ethernet protocol level which is further responsive to the Ethernet CRC.

Accordingly, a robust error detection system for wireless transmissions has been provided, which is particularly suited to high bandwidth wireless network links.

Other aspects and advantages of the present invention can be seen upon review of the figures, the detailed description, and the claims which follow.

BRIEF DESCRIPTION OF THE FIGURES

FIG. 25 illustrates the format of a wireless packet according to the present invention.

FIG. 26 illustrates a CRC generator for the wireless CRC field in the packet of FIG. 25.

DETAILED DESCRIPTION

A detailed description of a preferred embodiment of the present invention is provided with respect to the figures.

Figure 1:
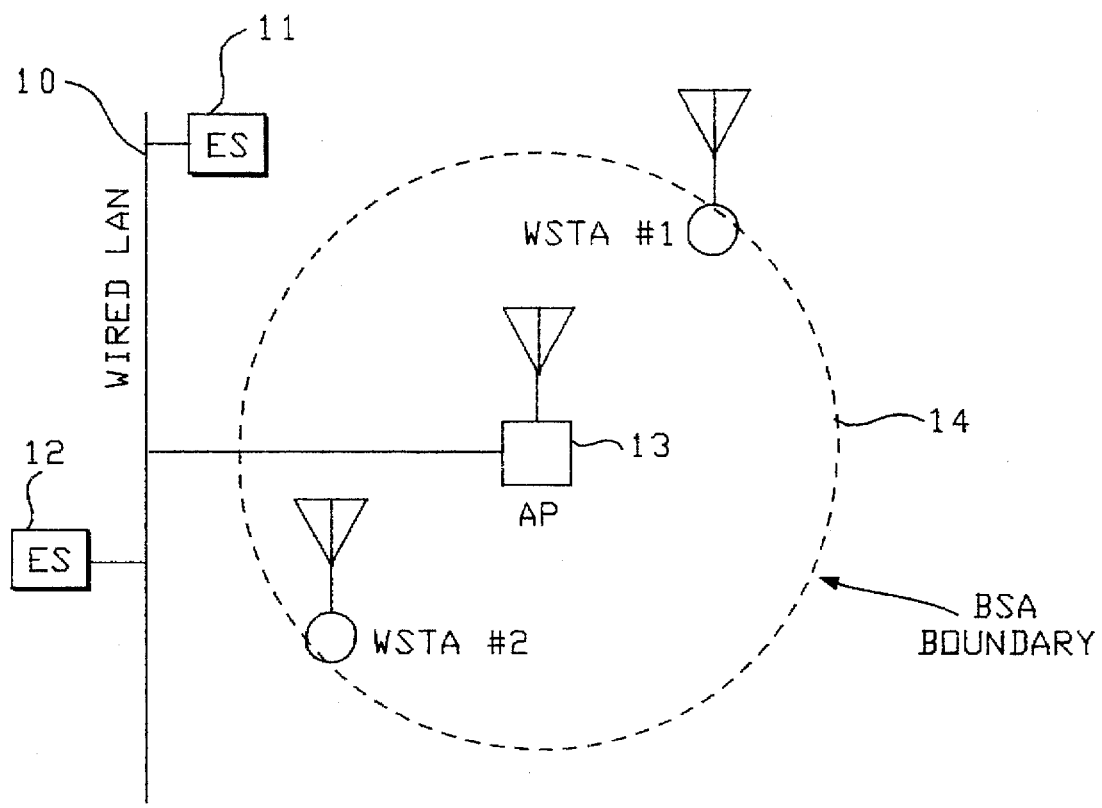
FIG. 1 is a schematic diagram of a communication system including the wireless link according to the present invention.

FIG. 1 shows a local area network including a wireless link according to the present invention. The system includes a wired LAN 10, such as a standard Ethernet system. Coupled to the wired LAN are a plurality of end stations 11, 12 as is standard in the art. Also, coupled to the wired LAN 10, is an access point 13 for communication with wireless stations, including wireless station WSTA 1 and wireless station WSTA 2. The access point has a typical range having a boundary as illustrated by the dotted line 14, which is defined by the receiver and transmitter technology used to define a basic service area.

Although a variety of communication channel technologies could be used, the preferred system according to the present invention is implemented using a relatively narrow band channel in the 2.4 GHz ISM band. Other example bands may include 5.2 or 5.7 GHz. The channel bandwidth in the preferred system is between 7 and 14 MHz. This channel allocation system allows for allocating a plurality of channels within the ISM band for adjacent basic service areas.

As mentioned above, wireless communication channels suffer a number of sources of error, including typical transmission errors, multipath interference effects, the presence of jammers, and other anomalies which may appear in the wireless medium. Thus, the present invention provides for a system of error detection adapted for a wireless communication channel.

Figure 2:
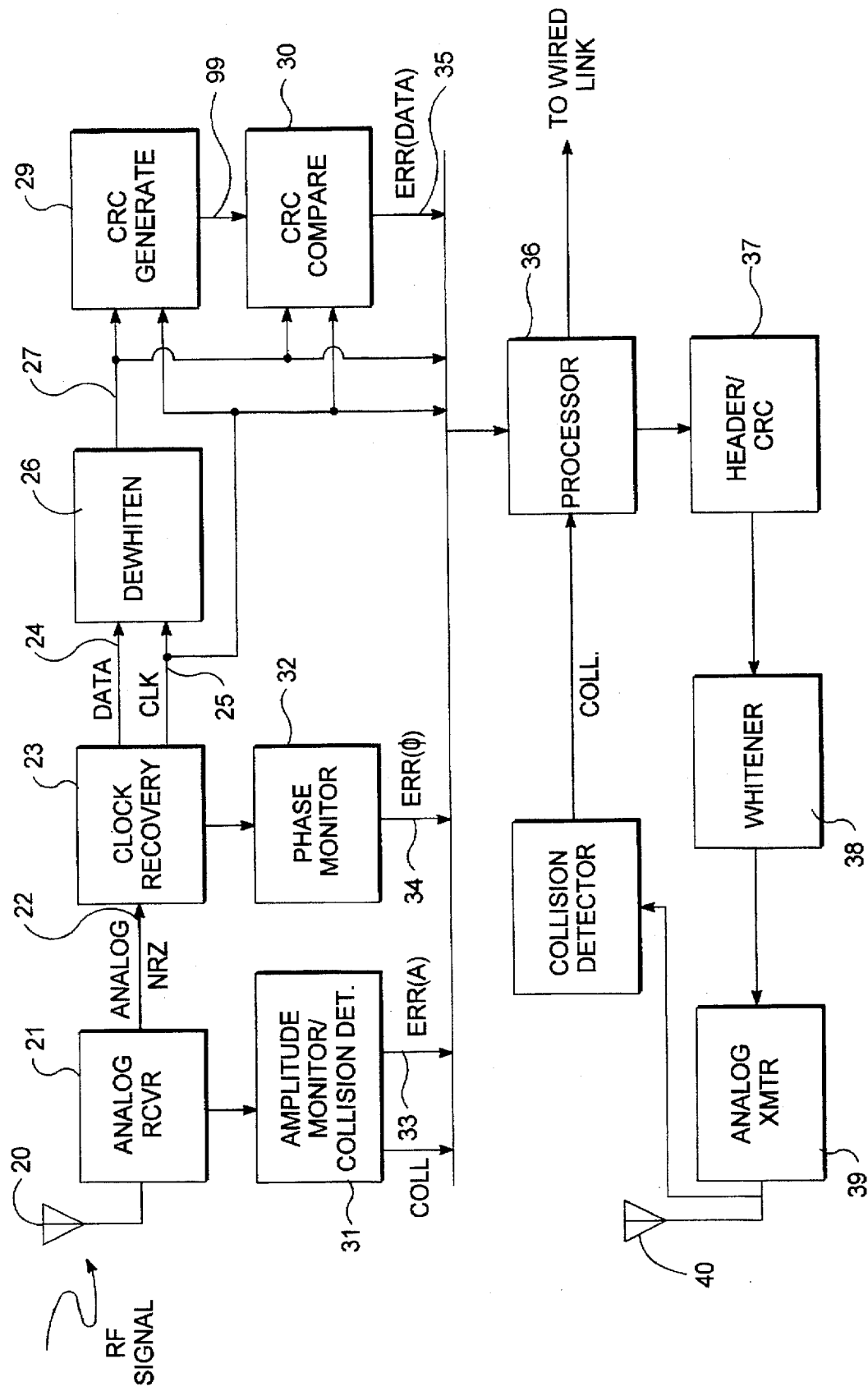
FIG. 2 is a schematic block diagram of a wireless station according to the present invention.

FIG. 2 provides a block diagram of a wireless station according to the present invention. The wireless station includes an antenna 20 coupled to an analog receiver 21. The analog receiver produces an analog NRZ signal on line 22 which is applied to the clock recovery circuit 23. The clock recovery circuit produces a data signal on line 24 and a clock signal on line 25 which is supplied to a dewhitening circuit 26. The dewhitening circuit outputs a dewhitened data signal on line 27.

The data on line 27 and clock on line 25 are supplied through a CRC generation circuit 29. Also, the signals on lines 27 and 25 are supplied through a CRC compare circuit 30, which compares the CRC supplied by the generate circuit 29 across line 31 with the CRC in the encapsulated packet. The CRC compare circuit 30 generates a data error signal on line 35 in the event the CRC in the received packet does not match the CRC generated by the generate circuit 29.

In addition, coupled to the analog receiver 21 is an amplitude monitor 31 which monitors the amplitude of the received signal to detect anomalies which are typical of erroneous data. The amplitude monitor 31 produces an amplitude error signal 33 when the amplitude of the received signal varies in an anomalous manner typical of erroneous data.

A phase monitor circuit 32 is coupled with the clock recovery circuit 23 according to the present invention which monitors changes in phase in transitions in the NRZ data stream 22. Phase monitor 32 generates a phase error signal on line 34 in the event an anomaly in phase of the NRZ data stream is detected which is typical of erroneous data.

The data on line 27, the clock on line 25, and the error signals on lines 33, 34 and 35 are supplied to a signal processor 36. The signal processor passes the received data frame for higher protocol level processing. Also, if an error signal is received, the signal processor produces a retry packet to send to the source of the packet. Further, the signal processor may generate its own packets to be transmitted to the access point. A wireless header and wireless CRC are applied in a wireless header and CRC generation block 37. The header/CRC block 37 is coupled to a whitener circuit 38 which whitens the NRZ data to increase the number of transitions in the packet to assist clock recovery at the receiver. The encapsulated wireless packet is then applied to an analog transmitter 39 and coupled into the medium through antenna 40.

Figure 3:
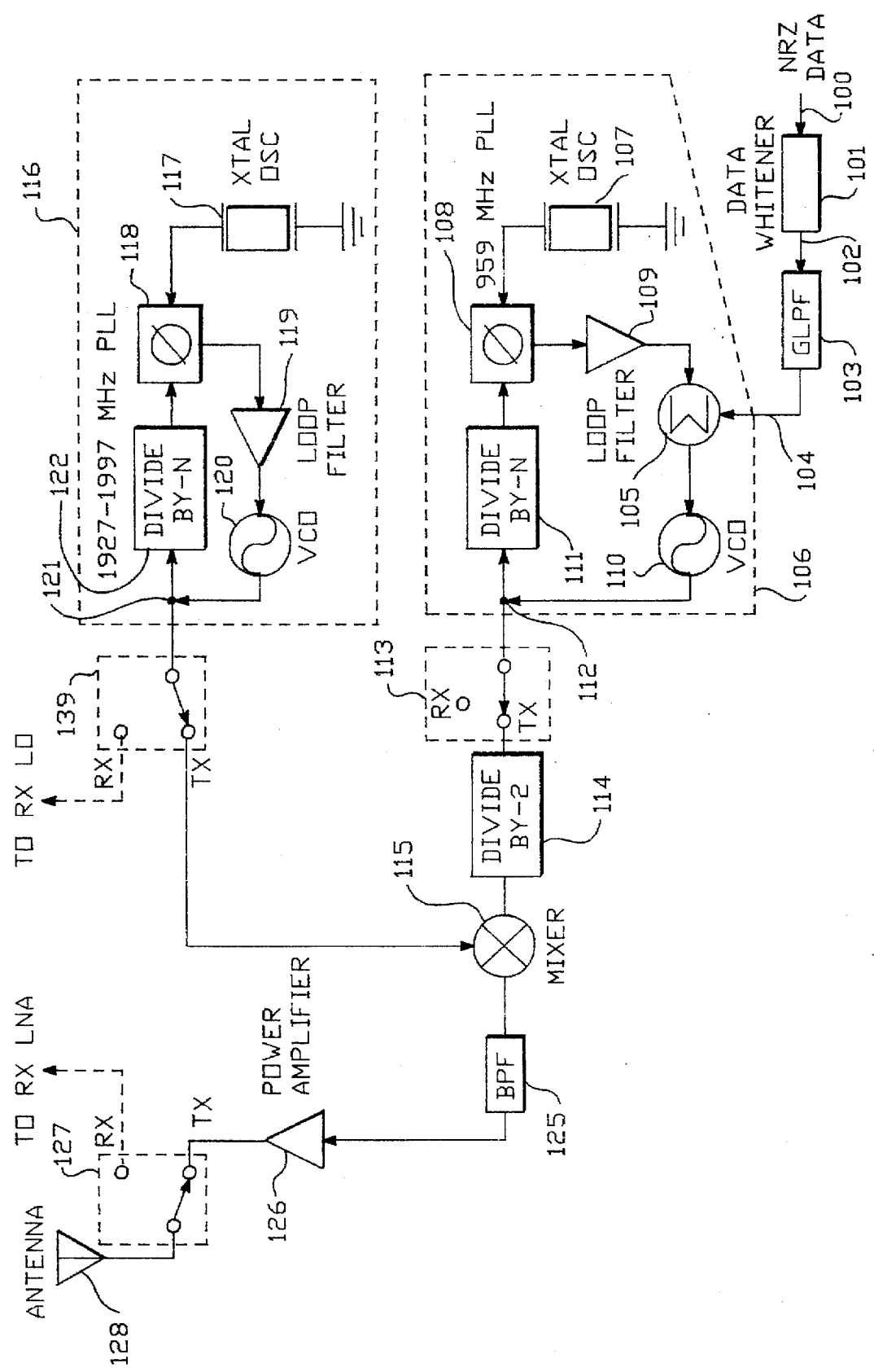
FIG. 3 is a schematic diagram of a transmitter according to the present invention.

A transmitter for the preferred system can be understood with respect to FIG. 3. The transmitter receives NRZ input data on line 100. It is applied to a gated data whitener 101 which produces a NRZ stream on line 102 having an increased number of transitions in the packet body (see FIGS. 27 and 28). This signal is applied to a gaussian low pass filter 103 which produces a smoothed data signal on line 104 which is coupled to the summing junction 105 in a phase locked loop generally 106. The phase locked loop 106 is coupled to a crystal oscillator 107. The output of the oscillator 107 is coupled to a phase detector 108. The output of the phase detector drives a loop filter 109. The output of the loop filter 109 is mixed with the data signal from line 104 in mixer 105. The output of the mixer 105 drives the voltage controlled oscillator 110. The output of the voltage controlled oscillator is supplied to a divide-by-N circuit 111. The output of the divide-by-N circuit 111 is supplied as input to the phase detector 108 to complete the phase locked loop. The output of the phase locked loop is supplied on node 112 at the output of the voltage controlled oscillator 110. This signal is coupled through a switch generally 113 which is operated in the transmit mode in the example shown, and coupled into a divide-by-2 circuit 114. The output of the divide-by-2 circuit is applied to a mixer 115.

The transmitter includes a second phase locked loop 116 which is driven by a crystal oscillator 117. The output of the crystal oscillator 117 is applied to a phase detector 118. The output of the phase detector is supplied to a loop filter 119 which drives a voltage controlled oscillator 120. The output of the voltage controlled oscillator is applied to node 121 as the output of the phase locked loop, and back to a divide-by-N circuit 122 which is supplied as input to the phase detector 118. The phase locked loop 116 operates at 1.927 to 1.997 MHz depending on the particular channel in which the transmitter is operating.

The output of the phase locked loop 116 is applied to a switch generally 139 which is coupled in a transmit mode in this drawing. The output of the switch 139 in the transmit position is coupled to the mixer 115, where it is mixed with the output of the divide-by-2 circuit 114. This mixer supplies a signal through a band pass filter 125. The output of the band pass filter 125 is supplied to a power amplifier 126 and coupled through a switch 127 to the transmit antenna 128.

Thus, the transmitter consists of two independent phase locked loops 106, 116. Each phase locked loop is locked to a crystal oscillator frequency reference. The phase locked loop 116 provides a frequency reference for the channel in which the transmitter operates. The phase locked loop 106 provides a modulated offset frequency which is added to the reference from phase locked loop 116 during transmit. The switches 139 and 113 allow switching between transmit and receive modes within a few microseconds or less. Thus, in this case, a frequency of 479.5 MHz (equal to the intermediate band frequency) is added to a signal of slightly less than 2 GHz to set up the communication channel.

Maintaining the phase locked loop 106 at 959 MHz allows both loops to remain free running during the receive mode without interfering with the intermediate band processing in the receiver. The signal is divided by two during transmit only. There is no output from divider 114 in receive mode.

As mentioned before, the data is passed through a whitening or scrambling circuit prior to the gaussian low pass filter 103. The whitener insures that the NRZ data stream has no DC component. This assists keeping the phase locked loop 106 locked to the channel center frequency.

Figure 4:
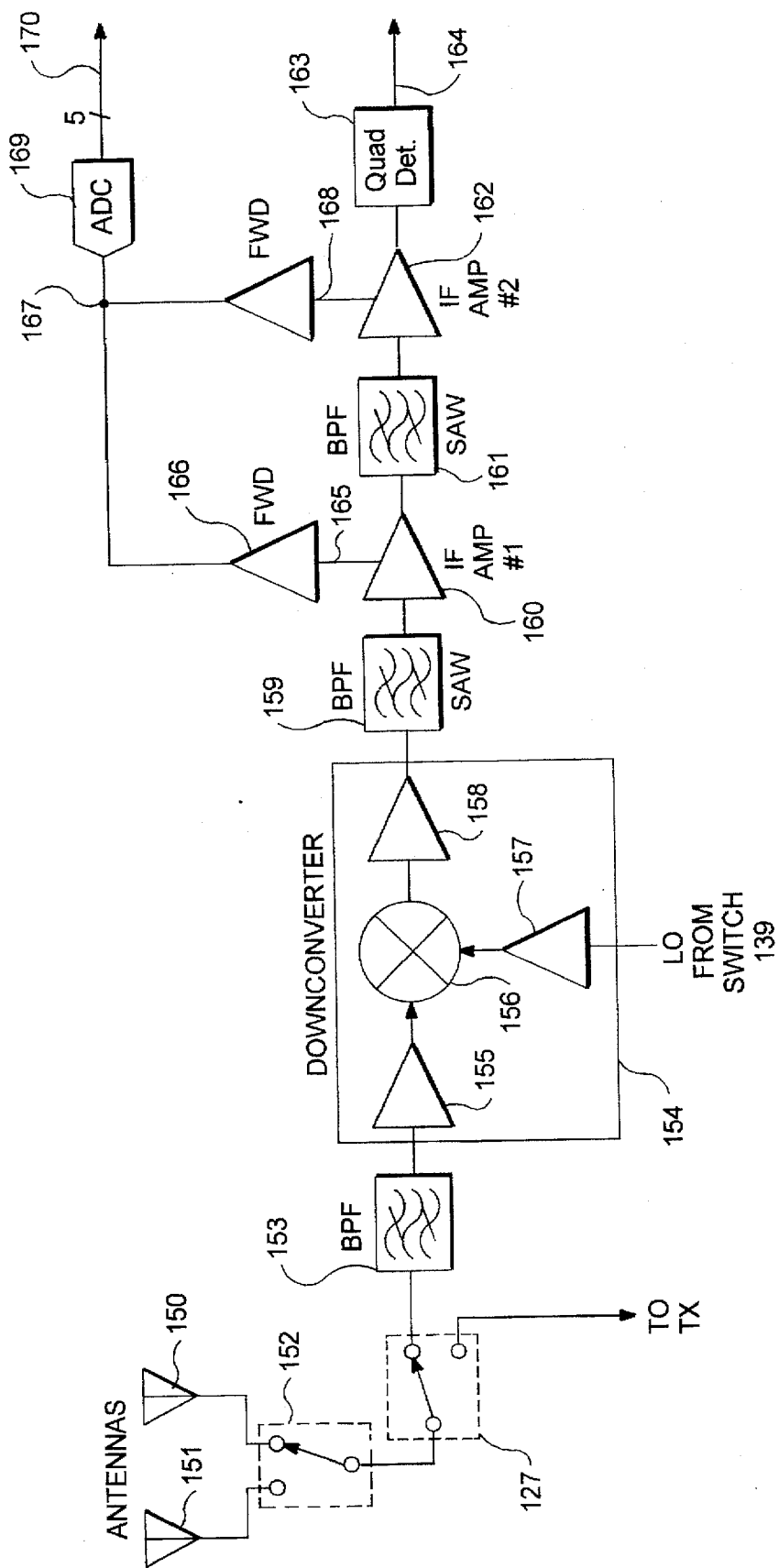
FIG. 4 is a schematic diagram of a receiver according to the present invention.

FIG. 4 is a schematic diagram of the receiver according to the present invention. The receiver includes a first antenna 150 and a second antenna 151. A switch 152 selects the antenna having the best received signal. The antennae are coupled through switch 127 to either the transmit circuitry (not shown) or receive circuitry through bandpass filter 153. In the figure, the switch 127 is coupled to the receive circuitry. The output of the antenna is supplied through a bandpass filter 153 into a downconverter 154. The downconverter includes an amplifier 155 which drives a mixer 156. The other input of the mixer 156 is received from amplifier 157 driven by the signal on node 121 through the switch 139 shown in FIG. 3. The output of the mixer 157 is supplied through amplifier 158 to a bandpass filter 159. The output of the bandpass filter 159 is supplied through an intermediate frequency amplifier 160 to a second stage bandpass filter 161. The output of the second stage bandpass filter 161 is supplied to a second stage intermediate frequency amplifier 162. The output of the amplifier 162 is supplied through a quadrature detector 163 to produce an analog NRZ signal on line 164.

The intermediate frequency amplifier 160 also produces an output on line 165 which is coupled through a full wave detector 166 to produce an analog packet envelope establishing a value at node 167. Node 167 is also driven by the output of amplifier 162 through full wave detector 168. Node 167 is coupled through an analog to digital converter 169 to supply a digital receive signal strength indication signal on line 170.

The receive signal strength indicator on line 170 is used to determine whether the received signal power is high enough to ensure the specified bit error rate for the receiver. The bit error rate for the receiver depends on the overall noise figure for the receiver design and the overall receiver noise bandwidth. However, other errors possible in the wireless environment may occur during reception of an otherwise good signal which cause the receive signal strength to fluctuate. Thus, by monitoring the receive signal strength indication on line 170, errors may be detected in a receive data packet.

As mentioned above, the receiver includes (and can share with the transmitter) two antennae 150 and 151 to provide spatial diversity to combat multipath effects. An input bandpass filter is used to eliminate any signals outside the ISM band. After the filters and switches, the signal is fed to the downconverter where it is converted to a 479.5 MHz intermediate frequency band signal. This intermediate frequency band is chosen because of the availability of small, inexpensive surface acoustic wave (SAW) filters. SAW filters have very sharp pass band to stop band rolloff characteristic, and excellent stopband attenuation. Thus, the filters 159 and 161 are implemented using SAW filters.

The first SAW filter 159 is used to knock out any out of band down signals at or below the level of the weakest desired signal for the system. The second SAW filter effectively eliminates any residual out of band energy. Both intermediate signal amplifiers 160 and 162 act not only as gain stages but as limiting amplifiers. In addition, each amplifier stage drives a full wave detector 166, 168. Summing the outputs of the full wave detectors provides a logarithmic received signal strength indicator function. This received signal strength indicator function produces a voltage which is logarithmically proportional to amplitude. The voltage is digitized in the analog to digital converter 169 to give the controller an indication of the power level of the receive signal. The receive signal power level nominally ranges between −40 dBm and −75 dBm. An extra 5 dB above and below this range is allowed to account for manufacturing verifications. Thus, the receive signal strength circuitry must cover a total dynamic range of 45 dB. Quantizing the signal on node 167 to 5 bit resolution gives a resolution level of 1.4 dB over this dynamic range.

The output of the quadrature detector provides an analog signal corresponding to the transmitted NRZ data. This analog signal is fed to a data and clock recovery circuit to produce a recovered NRZ data and clock.

Figure 5:
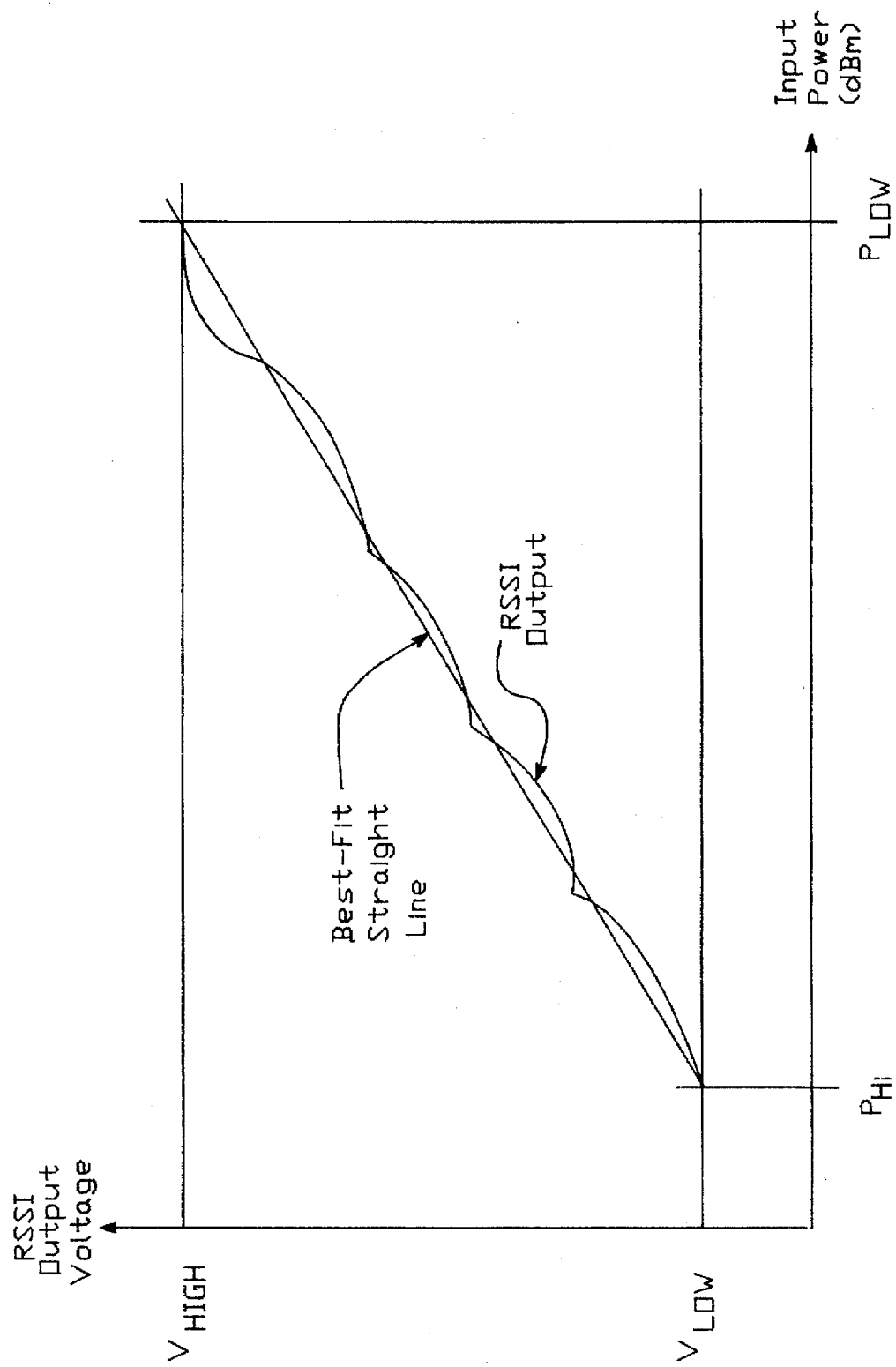
FIG. 5 is a graph illustrating the transfer curve for the RSSI output of FIG. 4.

FIG. 5 shows a transfer curve with the RSSI output on line 170 of the receiver of FIG. 4. As can be seen, as the input power falls along the horizontal axis, the output of the analog-to-digital converter 169 rises on the logarithmic scale, which can be represented by a best fit straight line as shown in the Figure.

Figure 6:
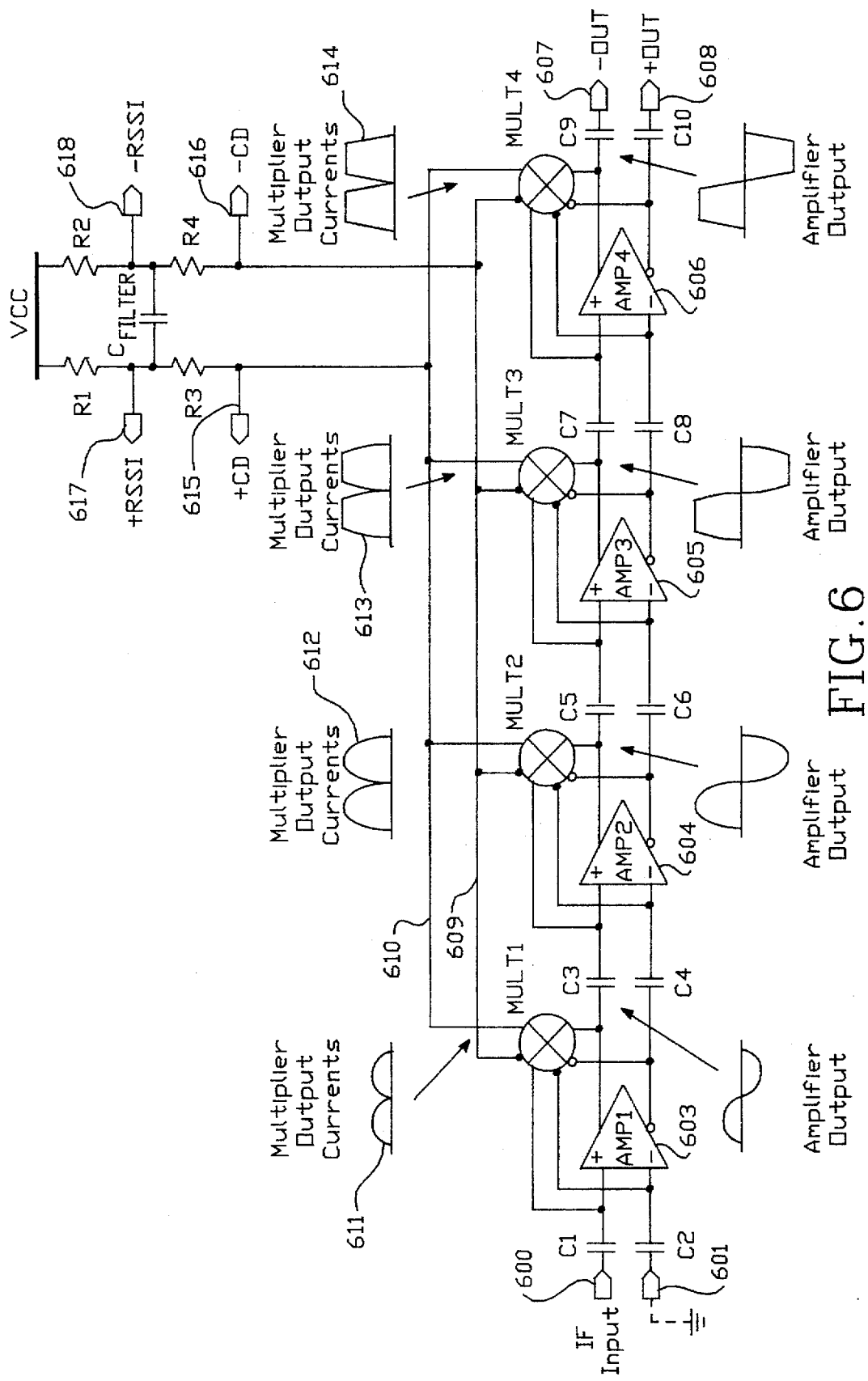
FIG. 6 is a schematic diagram of an intermediate frequency amplifier and fullwave detector, for use with the system of FIG. 4.
Figure 7:
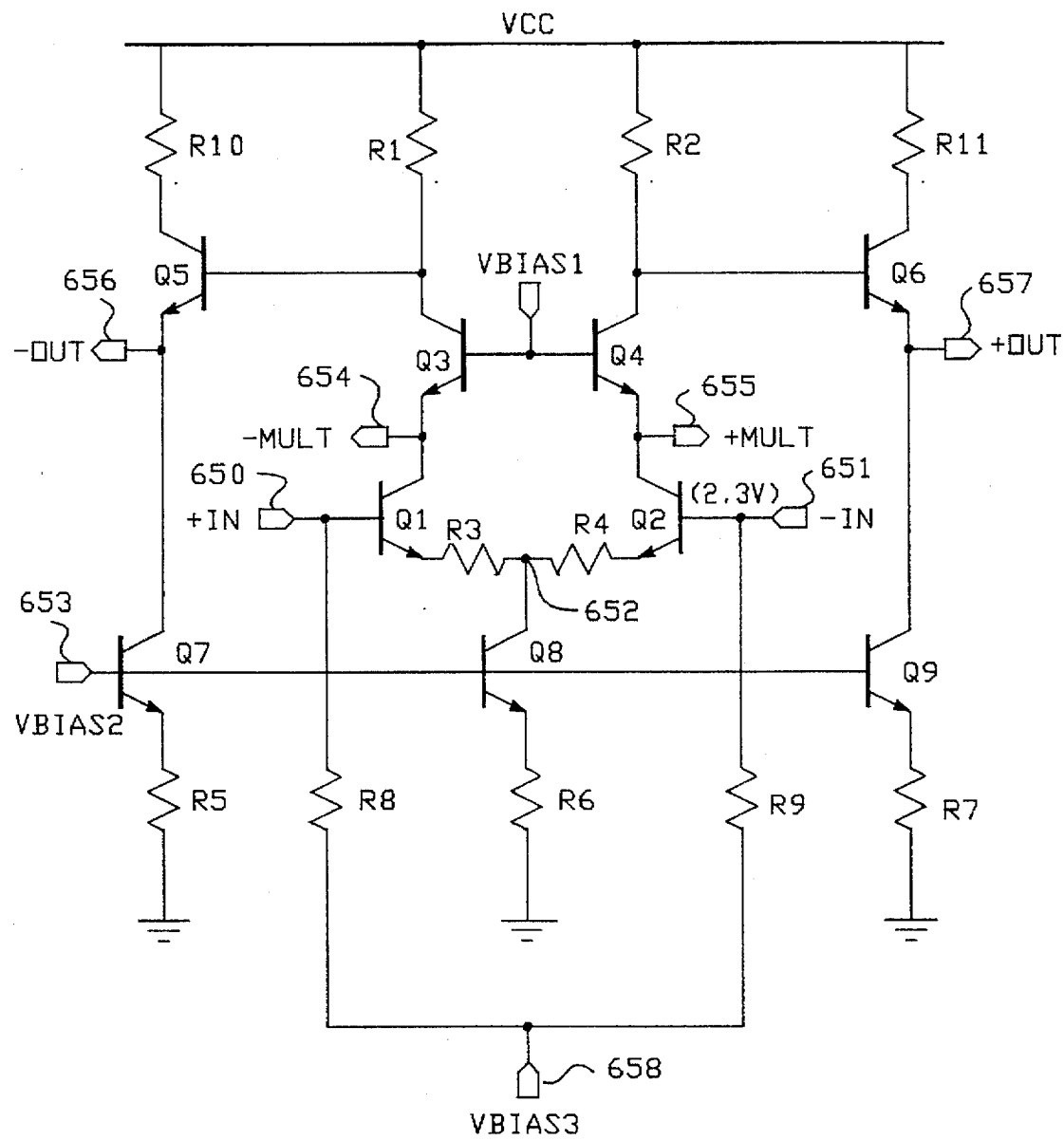
FIG. 7 is a schematic diagram of the amplifier used in the circuit of FIG. 6.
Figure 8:
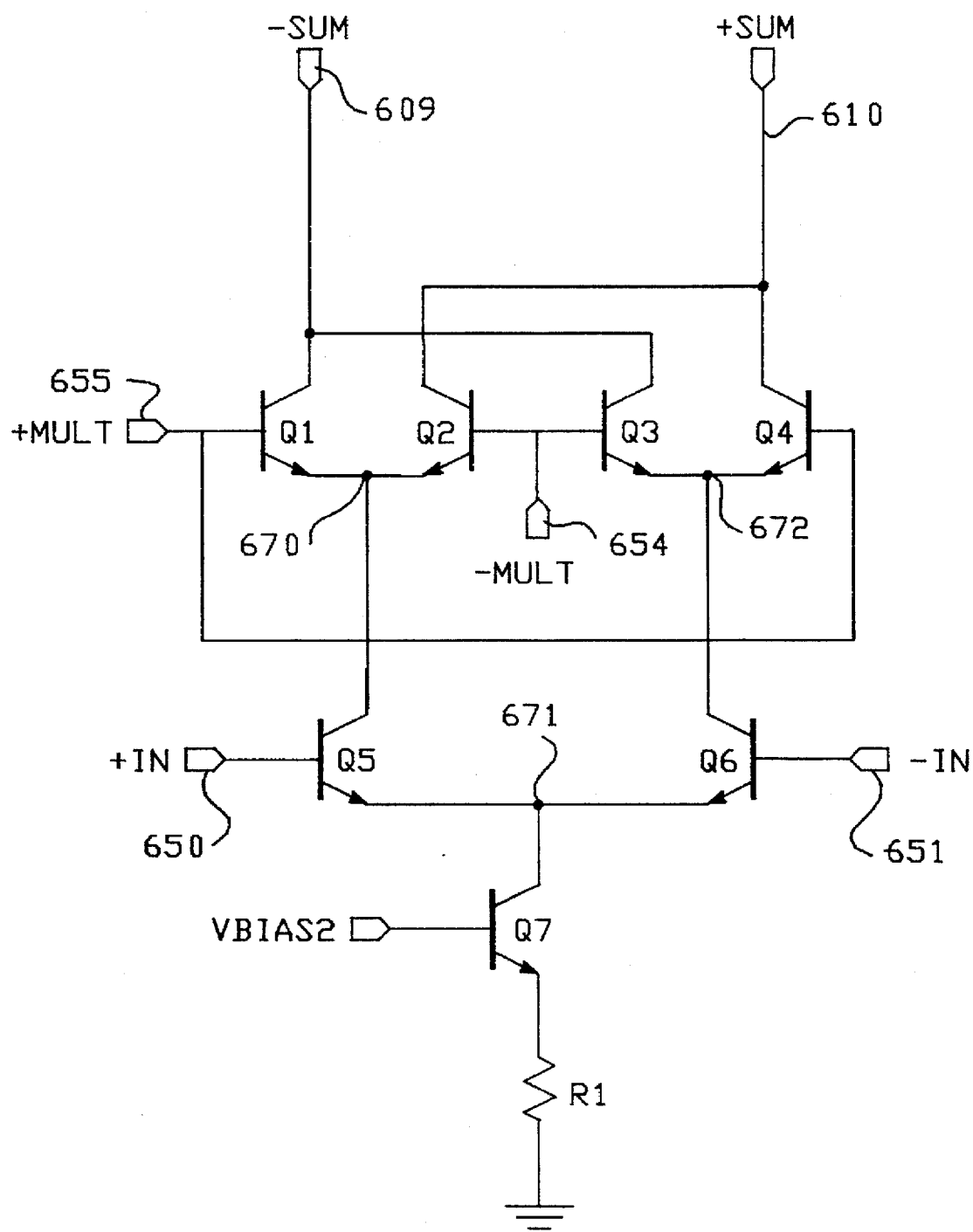
FIG. 8 is a schematic diagram of the multiplier used in the circuit of FIG. 6.

FIGS. 6 through 8 illustrate a preferred embodiment of the amplifiers and the fullwave detectors, such as amplifier 162 and fullwave detector 168, used in the receiver circuitry of FIG. 4. Thus, an intermediate frequency amplifier, such as amplifier 162, may include a four stage circuit as shown in FIG. 6. It receives the intermediate frequency input as a balanced two line signal on lines 600 and 601. Lines 600 and 601 are AC coupled through capacitors C1 and C2, respectively, to a first limiting amp 603. The outputs of the limiting amp 603 include true and compliment versions, and are AC coupled through capacitors C3 and C4 to a second stage limiting amp 604. Similarly, limiting amp 604 drives the input to limiting amp 605 through AC coupling capacitors C5 and C6. The outputs of amplifier 605 are AC coupled through capacitor C7 and C8 to the inputs of amplifier 606. The outputs of the amplifier 606 are AC coupled through capacitors C9 and C10 to the amplifier output stages on lines 607 and 608. The circuit schematic for one of the amplifier stages is described with respect to FIG. 7.

The full wave detector consists of multiplier circuits MULT1, MULT2, MULT3, and MULT4. The first multiplier MULT1 receives as input, the signal supplied to the input of the first amplifier 603, and the signal supplied at the output of the first amplifier 603. The signals on the multiplier output terminals on lines 609 and 610 have the shape illustrated at trace 611.

The second multiplier MULT2 has its inputs connected to the inputs of the second amplifier 604, and to the outputs of the second amplifier 604. The outputs of the multiplier MULT2 are connected to lines 609 and 610 and produce signals having the shape illustrated at trace 612. The multiplier MULT3 is connected to the inputs and the outputs of the third amplifier 605, and has its outputs connected to line 609 and 610. The outputs of the third multiplier MULT3 have the shape illustrated at trace 613. Finally, the fourth multiplier MULT4 is connected across the fourth amplifier 606. Its outputs are connected to lines 609 and 610 and produce a signal having a shape illustrated at trace 614. The inputs to the collision detect comparator are provided on lines 615 and 616 which are connected to lines 609 and 610. Line 615 is connected to the power supply $V_{CC}$ through resistors R3 and R1. Similarly, line 616 is connected to the power supply $V_{CC}$ through resistors R4 and R2. At the node between resistors R3 and R1, a receive signal strength indication RSSI output is provided on line 617. Similarly, at the node between resistors R2 and R4, the other RSSI output is provided on line 618. A capacitor $C_{FILTER}$ is connected between lines 617 and 618.

FIG. 7 provides a schematic diagram of a limiting amplifier, such as might be used as amplifiers 603 through 606 in the circuit of FIG. 6. The inputs to the amplifier provided on lines 650 and 651 at the base of transistors Q1 and Q2 as inputs to the multiplier. The input terminals on lines 650 and 651 are connected across resistors R8 and R9, respectively, to a bias potential $V_{BIAS3}$ at node 658. The emitters of transistors Q1 and Q2 are connected through resistors R3 and R4, respectively, to node 652. Node 652 is connected through the current source transistor Q8 and resistor R6 to ground. Current source transistor Q8 has its base connected to a bias potential $V_{BIAS2}$ on line 653.

The collector of transistor Q1 provides the minus output (−MULT) the multiplier on line 654, and the collector of transistor Q2 provides the positive output (+MULT) multiplier on line 655.

The collector of transistor Q1 is connected to the emitter of transistor Q3, which has its collector coupled across resistor R1 to the supply $V_{CC}$. The base of transistor Q3 is connected to the bias potential $V_{BIAS1}$. The collector of transistor Q2 is connected to the emitter of transistor Q4 which has its collector connected across resistor R2 to the supply voltage $V_{CC}$. The base of transistor Q4 is connected to the bias $V_{BIAS1}$.

The minus output (−OUT) of the amplifier is provided through emitter follower transistor Q5 which has its base connected to the collector of transistor Q3, and its emitter connected to line 656 providing the minus output. The positive output (+OUT) is provided through emitter follower Q6 which has its base connected to the collector of transistor Q4, and its emitter connected to line 657. The collector of the transistor Q5 and the collector of transistor of Q6 are connected to the supply voltage $V_{CC}$ across resistors R10 and R11, respectively.

The emitters of transistors Q5 and Q6 are coupled to current source transistors Q7 and Q9, respectively. The emitter of transistor Q7 is connected across resistor R5 to ground. The base of transistor Q7 is connected to the bias voltage $V_{BIAS2}$ on line 653. Similarly, the emitter of transistor Q9 is connected across resistor R7 to ground and the base of transistor Q9 is connected to the signal $V_{BIAS2}$.

The multiplier used as the fullwave detector, such as multiplier MULT 4 in FIG. 6, is shown in FIG. 8. This circuit consists of transistors Q1 and Q2 which have their emitters coupled to node 670, which is connected to the collector of transistor Q5. The emitter of transistor Q5 is connected to node 671. Node 671 is connected to the collector of current source transistor Q7, which has its emitter connected across resistor R1 to ground. The base of transistor Q7 is coupled to the bias potential $V_{BIAS2}$. Also, an emitter coupled pair consisting of transistors Q3 and Q4 is included. The emitters of transistors Q3 and Q4 are connected to node 672. Node 672 is connected to the collector of transistor Q6. The emitter of transistor Q6 is connected to node 671. The inputs (+IN, −IN) to the multiplier are connected to the first stage (Q5, Q6) of emitter coupled pairs as illustrated. The positive multiplier input (+MULT) is supplied on line 655 to the bases of transistors Q1 and Q4. The negative multiplier input (−MULT) is connected on line 654 to the bases of transistors Q2 and Q3.

The output of the multiplier is supplied on the minus sum (−SUM) line 609 and the plus sum (+SUM) line 610 to the load illustrated in FIG. 6 consisting of the resistors R1 and R4 and the capacitor $C_{FILTER}$.

Figure 9:
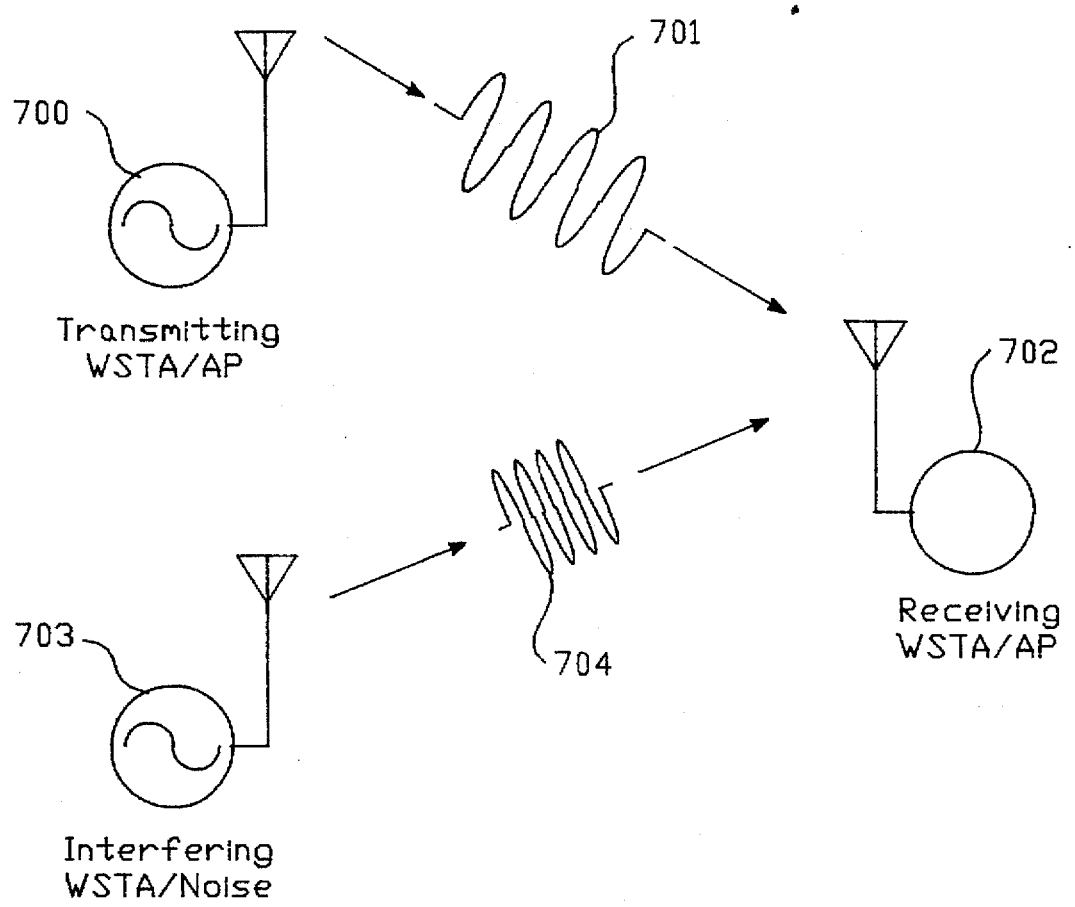
FIG. 9 is a diagram used for describing noise in a wireless environment.

With reference to FIGS. 9–13, the wireless environment is illustrated, and how errors are detected using the receive signal strength indicator and using phase monitoring techniques. As can be seen in FIG. 9, a transmitting wireless station or access point 700 will transmit wireless packet 701 to a receiving wireless station or access point 702. If at the same time, an interfering wireless station or source of noise 703, transmits a signal 704, the received packet 701 will be corrupted by the resulting noise. The corruptions may be reflected in the magnitude or the phase of transitions in the received signal 701 at the receiving station 702. Alternatively, they may be reflected in both magnitude and phase.

Figure 10:
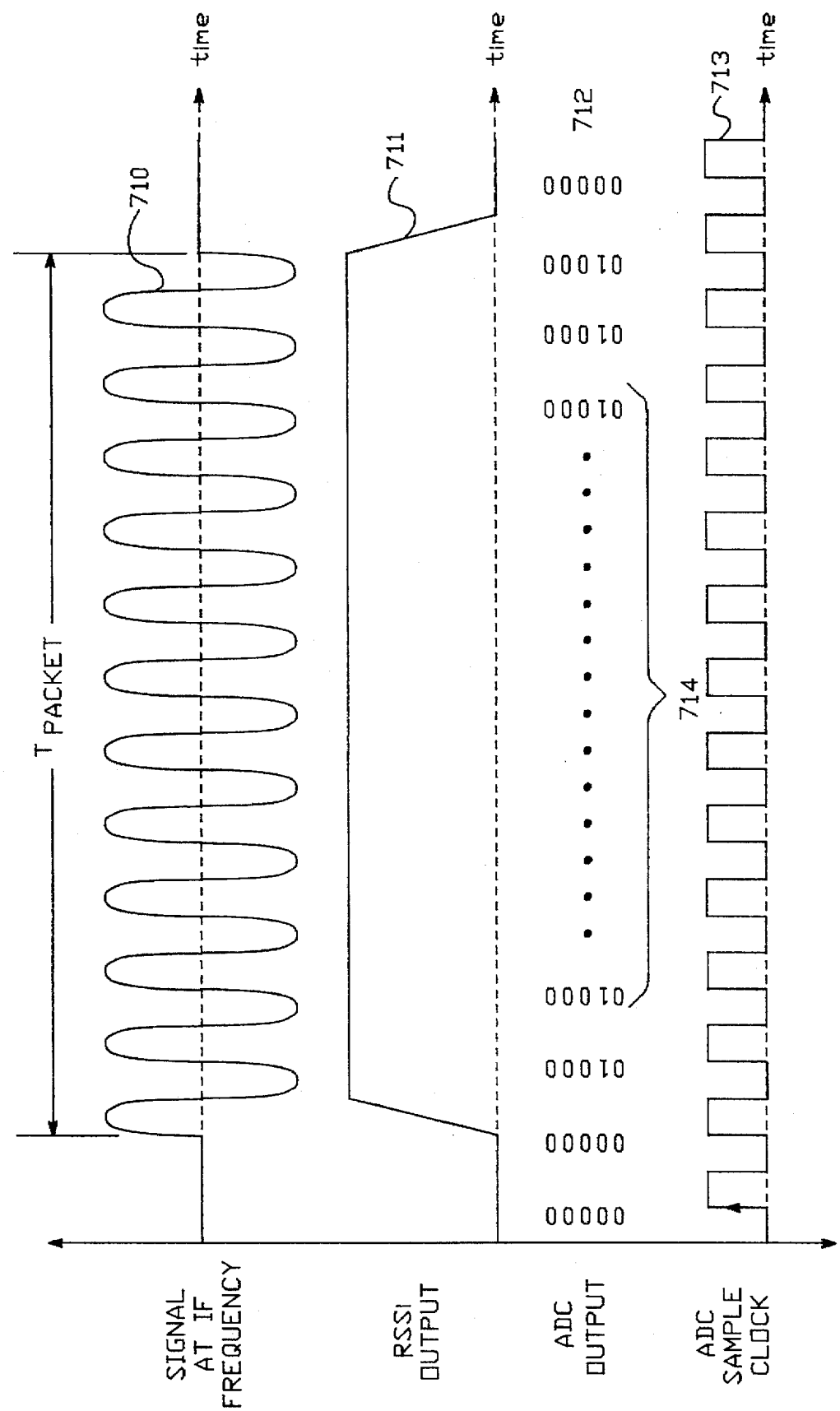
FIG. 10 is a graph of normal wireless packet reception with reference to amplitude monitoring.

FIG. 10 illustrates normal wireless packet reception in the receive signal strength indication. A received signal such as the output of filter 159 of FIG. 4 is shown at trace 710. The receive signal strength output is relatively level for this circuit as shown at trace 711. The output of an analog to digital converter 169 will thus be a sequence of values as shown along line 712 which transitions from 0 to 8 binary at the beginning of the packet and from 8 binary to 0 at the end of the packet. As long as the signal strength is good, the ADC output in region 714 does not change significantly. A sample clock on trace 713 is shown for strobing the analog to digital converter 169.

Figure 11:
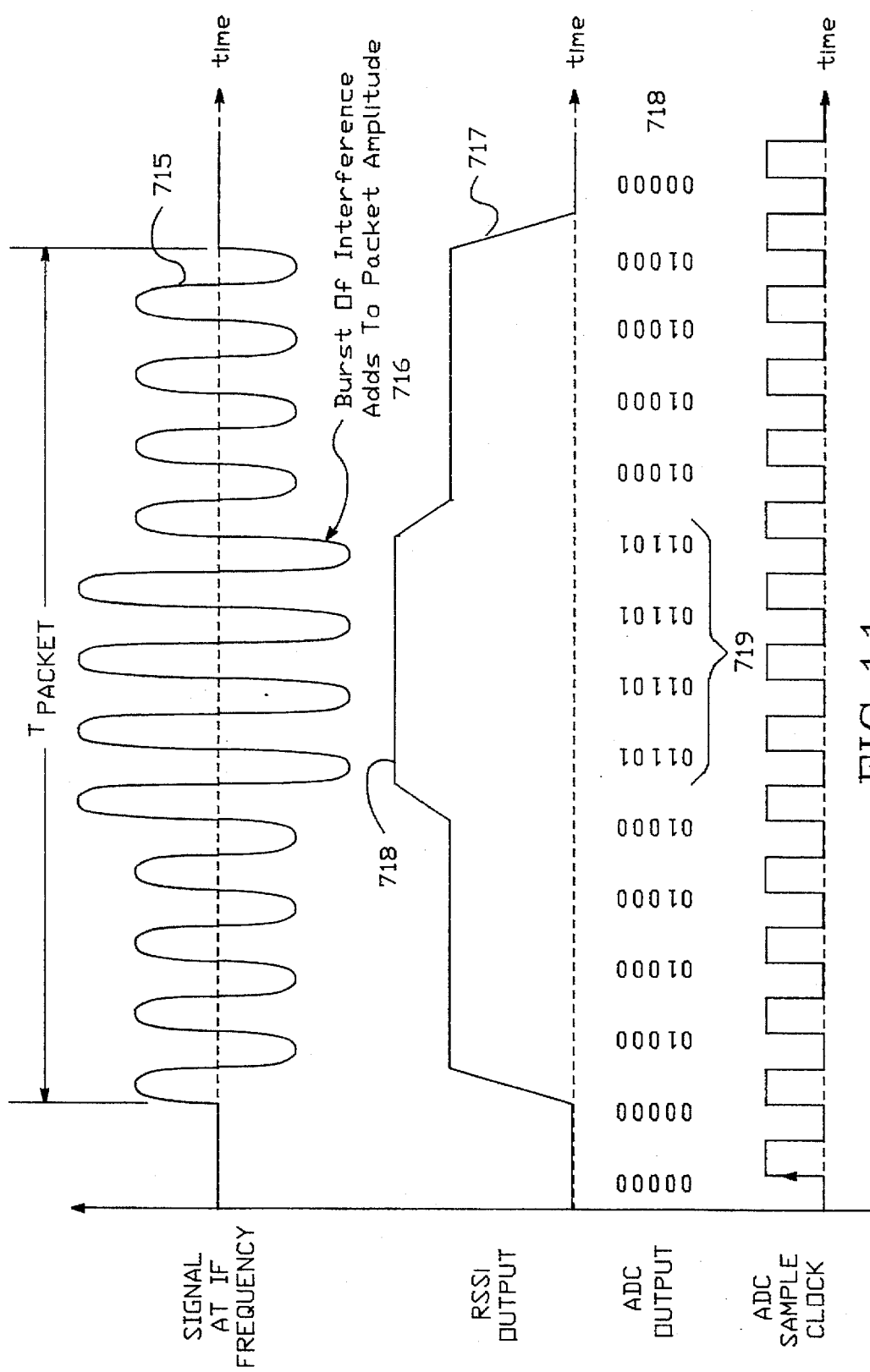
FIG. 11 is a graph showing wireless packet reception with interference affecting the amplitude of the received signal.

FIG. 11 illustrates what happens when a wireless packet is received with interference. In particular, the signal received as shown at trace 715 may have a burst of interference, generally 716, during the packet which adds to the packet amplitude. The RSSI output at trace 717 will thus have a bump, generally 718, corresponding to the increase in amplitude. For this reason, the analog to digital outputs along line 718 will include a regions, generally 719, in which the RSSI has an anomalous increase during the packet reception. The interfering signal could also reduce the magnitude in a similar manner. This anomalous increase or decrease can be processed, and used to indicate errors in the received packet.

Figure 12:
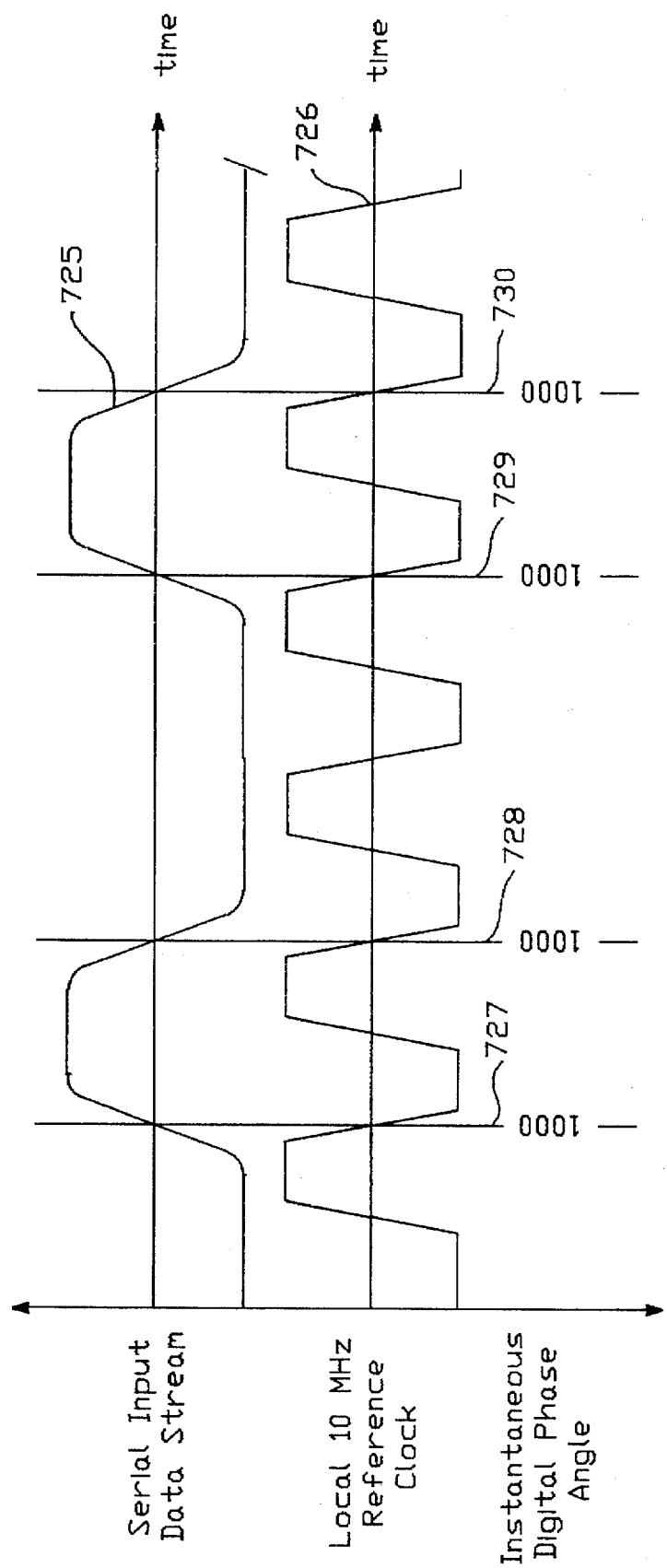
FIG. 12 is a graph showing a normal wireless packet reception with reference to the phase monitoring.
Figure 13:
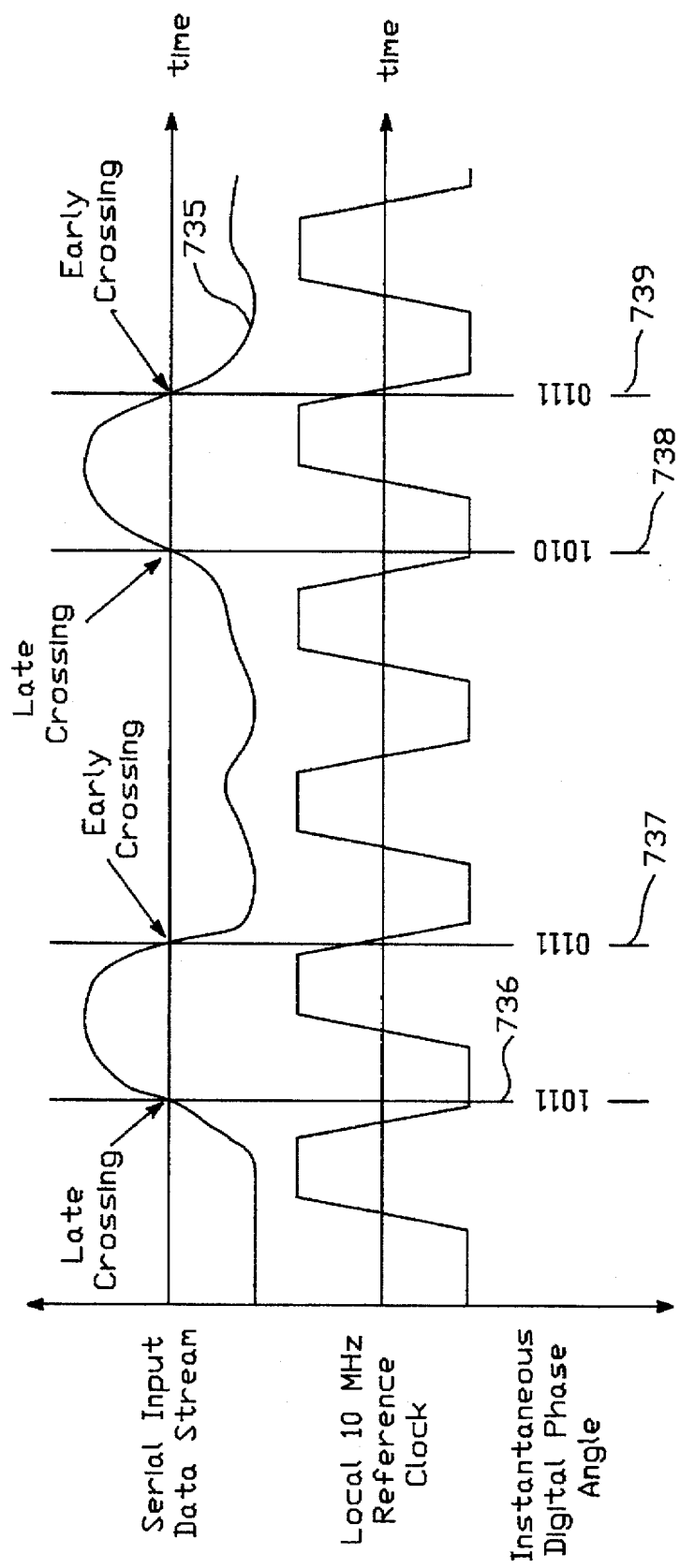
FIG. 13 is a graph illustrating wireless packet reception with interference affecting the phase of the received signal.

FIGS. 12 and 13 illustrate the use of phase monitoring to detect errors. A serial data stream is produced on line 164 in the receiver of FIG. 4. This output stream may have the appearance as shown along trace 725. A local reference clock at trace 726 regenerated from the received signal using the clock recovery circuit has phase transitions, generally 727, 728, 729, 730 which correspond to transitions of the received signal on trace 725.

In FIG. 13, the effect of noise is shown. In particular, the incoming data stream has been set up as shown in FIG. 12 to have an instantaneous digital phase angle of 1000 produced at the output of the decoder. The noisy signal is shown at trace 735 in FIG. 13, will have a transition which occurs at the instantaneous angle of 1011 as shown at point 736, at the point 0111 as shown point 737, back to 1010 as shown at point 738, and then again at 0111 as shown at point 739. Thus, the output of the recursive filter in the clock recovery circuit will differ from the instantaneous phase angle for each of the transitions shown in FIG. 13. This information can be processed, to indicate erroneous data in the received data stream. The sequence of late crossings and early crossings as shown in FIG. 13 may not change the output of the digital filter significantly, because the effects may average out. Nonetheless, the information at the output of the decoder can be used to detect errors.

Figure 14B:
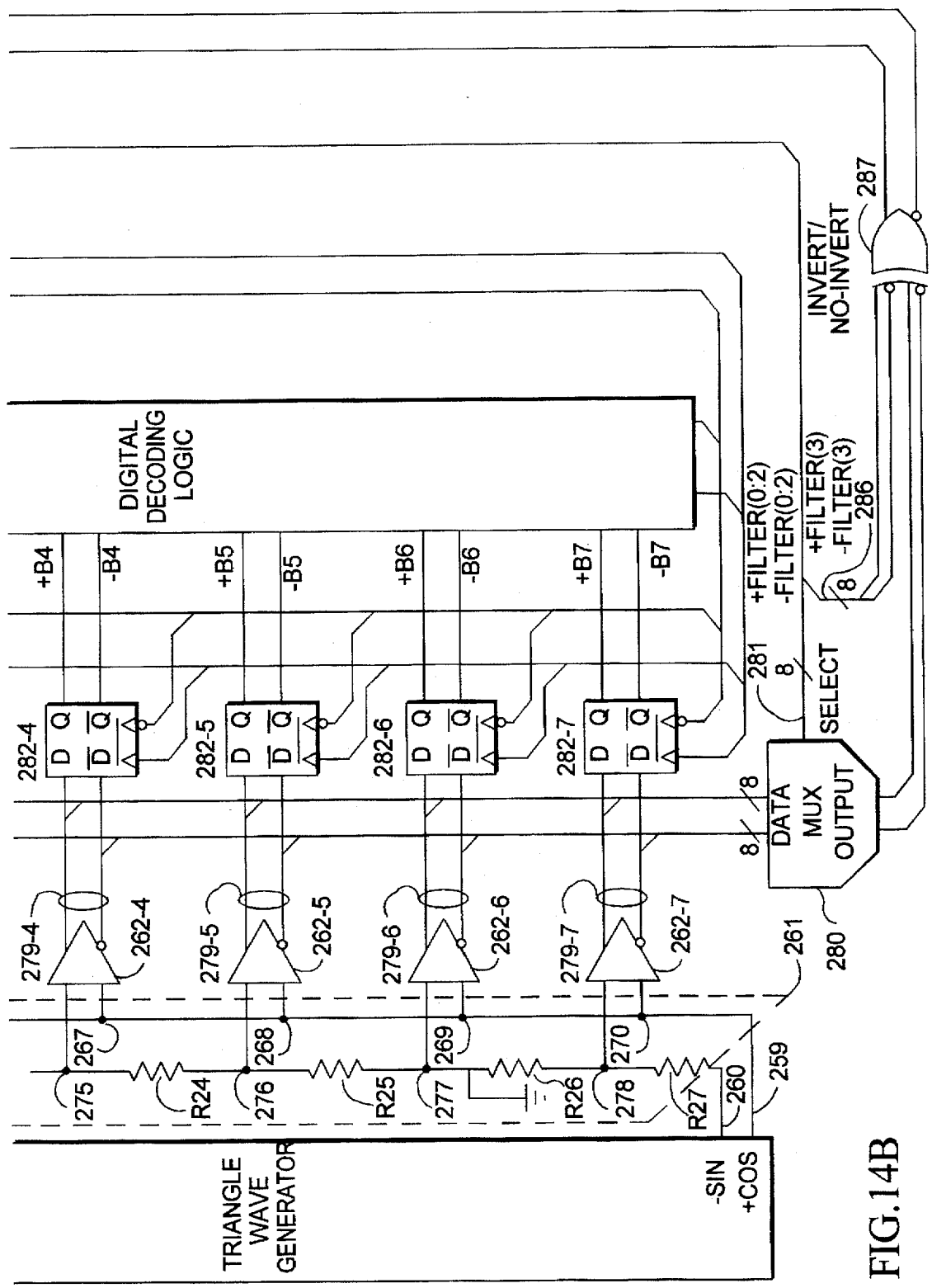
FIG. 14 illustrates the clock recovery and phase monitoring circuitry according to the present invention.

FIG. 14 illustrates one embodiment of the clock recovery circuitry, including a phase change monitor circuit attached to a recursive digital filter according to the present invention, designed to be implemented in a bipolar integrated circuit. Other integrated circuit technologies, such as CMOS technology could be applied as well.

As illustrated in FIG. 14, the receiver produces a local NRZ data stream in a differential format on lines 250. The local data stream is fed on lines 250 through differential buffer 251 to lines 252. Lines 252 are supplied as input to edge detection circuitry 253. Edge detection circuitry is described below with reference to FIGS. 16 and 17. Also, the data stream on line 252 is supplied to the data recovery latch 254. The data recovery latch 254 is clocked by the recovered clock signal which is generated as described below.

The circuit receives as input a 20 MHz local clock signal in a single ended format such as TTL on line 255. This local clock signal is produced in reliance on the stable clock in the Ethernet environment, or with other equivalent, highly accurate clock technology. The local clock on line 255 is supplied to a triangle wave generator 256 which is described in one example format with respect to FIG. 18. The triangle wave generator 256 produces two reference triangle waves in a differential format. Thus, the outputs include a minus cosine (−COS) output on line 257, a plus sine (+SIN) output on line 258, a plus (+COS) cosine output on line 259, and a minus sine (−SIN) output on line 260. These signals on lines 257 through 260 are supplied to a resistor ladder, generally 261. The resistor ladder is implemented using monolithic resistor technology in the preferred system. The resistor ladder 261 drives a sequence of differential buffers 262-0 through 262-7.

Thus, the resistor ladder 261 includes nodes 263 to 278. Node 263 is coupled to line 257. Resistor R20 is coupled between node 263 and node 264. Resistor R21 is coupled between node 264 and node 265. Resistor R22 is coupled between node 265 and node 266. Resistor R23 is coupled between node 266 and node 267. Nodes 267, 268, 269, and 270 are all coupled to line 259. Similarly, nodes 271, 272, 273, 274, and 275 are all coupled to line 258. Resistor R24 is coupled between node 275 and node 276. Resistor R25 is coupled between node 276 and node 277. Resistor R26 is coupled between node 277 and node 278. Node 278 is coupled across resistor R27 to line 260.

Nodes 265 and 277 may not actually be connected to ground, but are in effect at a virtual AC ground, as indicated by the dashed connection.

Each of the differential buffers 262-0 through 262-7 produces a reference clock signal, 279-0 through 279-7, respectively. The inputs to the differential buffers are set to trip based on the relative magnitudes of the reference waves produced by the triangle wave generator, and set with precision by the resistor ladder 261. Thus, buffer 262-0 is coupled to nodes 271 and 263. Buffer 262-1 is coupled to nodes 272 and 264. Buffer 262-2 is coupled to nodes 273 and 265. Buffer 262-3 is coupled to nodes 274 and 266. Buffer 262-4 is coupled to nodes 275 and 267. Buffer 262-5 is coupled to nodes 276 and 268. Buffer 262-6 is coupled to nodes 277 and 269. Finally, buffer 262-7 is coupled to nodes 278 and 270. In this embodiment, the eight reference clock signals, 279-0 through 279-7, are coupled to a multiplexer 280, which is controlled by the select signal on lines 281 designated FILTER(0:2).

Also, the reference clock signals are connected to respective analog latching comparators 282-0 through 282-7. The analog latching comparators are clocked in response to the edge detection signals on lines 283 produced by the edge detection circuit 253. The analog latching comparators 282-0 through 282-7 store a state of the plurality of reference clock signals on a detected transition in the input data stream. This stored state information is supplied to digital decoding logic 284, an example of which is provided below with reference to FIGS. 12 and 13, which may be synchronized with the edge detection signals on line 283.

The output DECODER(0:3) of the digital decoding logic 284 is supplied through a recursive digital filter 285 in the preferred embodiment. The output FILTER(0:3) of the recursive digital filter, which is also clocked by the edge detection signals on line 283, includes the select signal FILTER (0:2) on line 281, and the invert/no-invert signal (FILTER(3)) on line 286. The output of the multiplexer 280 is supplied to the differential exclusive OR gate 287. The opposite input of the exclusive OR gate 287 includes the invert/non-invert signal on line 286. The output of the exclusive OR gate is the recovered clock signal on line 288 which is used to clock the analog latching comparator 254 to recover the data stream. The differential current mode logic signals on lines 288 and 289 are converted to a single ended format, such as TTL in translators 290 and 291, respectively.

The data received from a wireless medium is subject to a number of errors or even interference from jammers. Thus, the ability to detect a wide variety of errors types in a received data stream is important. Thus, in the embodiment of FIG. 15, the output of the digital decoding logic (or the input to the recursive digital filter), and the output of the recursive digital filter are coupled to a phase change monitor 295 which is, in turn, coupled to the host system on line 296. A recursive digital filter 285 samples several bit periods to get an accurate estimate of the phase of the clock with respect to the local reference signal. Once the data stream has been synchronized with the local clock, the phase error within the recursive filter becomes quite small because all data transitions occur at fixed time intervals. However, if a jammer comes along and starts to corrupt the incoming signal, the zero crossings of the data will no longer occur at unit intervals. By sensing the digital error bits of the digital filter during packet reception, it can be determined how uniform in time the zero crossings are. A large spread in the data transition times indicates with high probability that the incoming packet is being corrupted. Thus, the phase change monitor 295 may be implemented as logic which monitors the difference between the inputs to the recursive filter and the outputs to the recursive filter to detect the presence of changes. Thus, the phase change monitor 295 informs the host of sudden unexplainable phase changes which indicate the likelihood of erroneous data.

Figure 15:
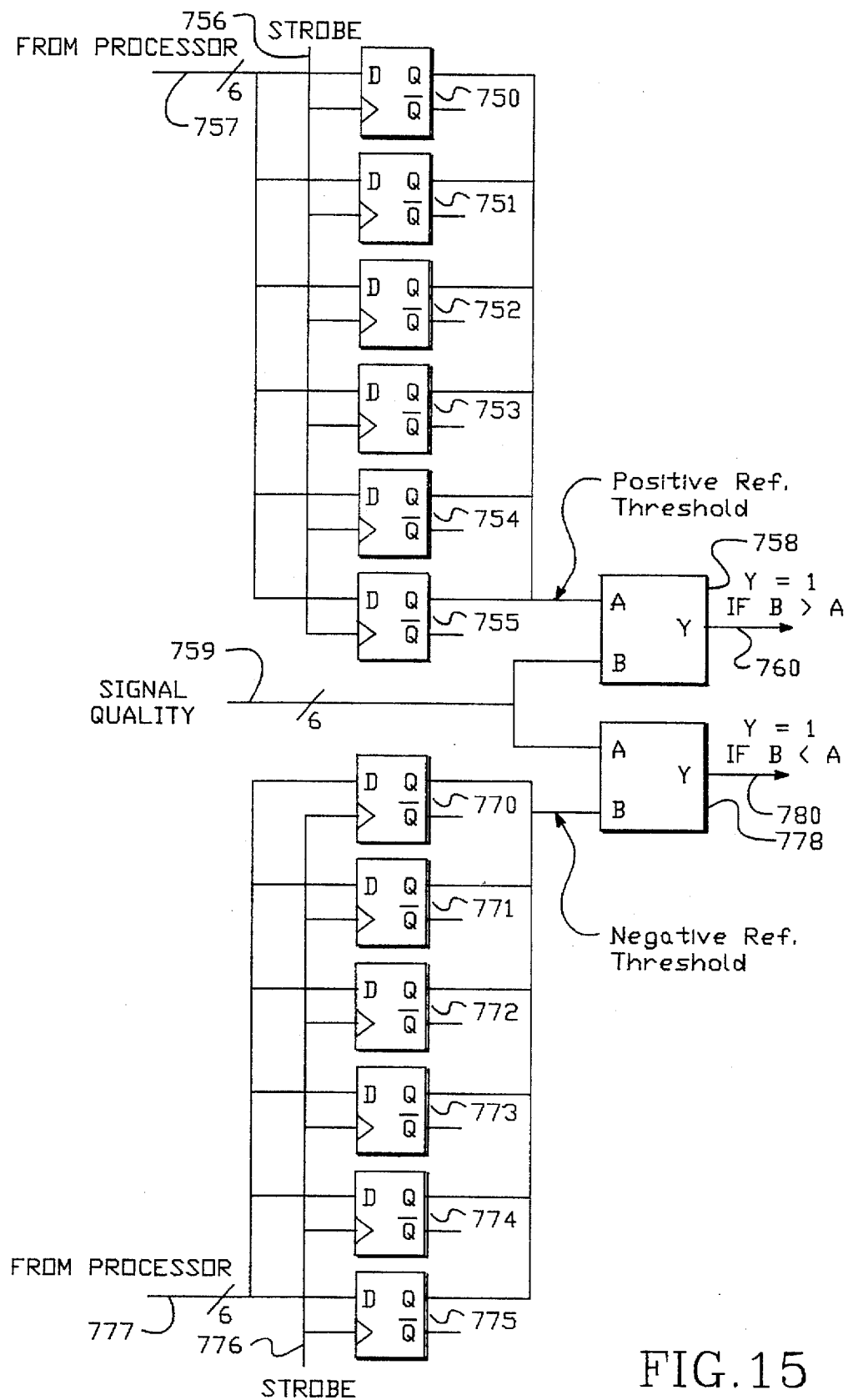
FIG. 15 is a logic diagram of a digital magnitude comparator for use with the system of FIG. 14, or of FIG. 4.

FIG. 15 illustrates a digital magnitude comparator which can be used with the phase monitor circuit 295 of FIG. 14, and also with the processor of the received signal strength indication for amplitude monitoring in the receiver of FIG. 4. Alternative systems may accomplish this function with software. The comparator comprises a first sequence of flip-flops 750, 751, 752, 753, 754, and 755. These six flip-flops are strobed in response to a strobe signal 756 and load six bits of data supplied from the processor across line 757. The value stored in the flip-flops is compared in a comparator 758 with the signal quality signal on line 759 generated at the output of the decoder for the clock recovery circuit, or the output of the analog to digital converter for the RSSI embodiment. The output is supplied on line 760 as an interrupt flag which is high if the signal quality signal is greater than the value stored by the processor.

Also shown in the figure is a circuit for making a negative threshold determination which is made up of the six flip-flops 770–775. These flip-flops are supplied data from the processor across line 777 and strobed by the strobe signal on line 776. A negative reference threshold is supplied at the output of these registers as an input to comparator 778. The other input to comparator 778 is the signal quality value from line 759. The output of the comaparator 778 is an interrupt signal on line 780 which is true if the negative reference threshold is less than the signal quality signal.

Under program control, the data in the flip-flops can be dynamically managed in order to detect characteristics of the received data stream which indicate anomalies corresponding to probable errors in the signal.

Figure 16:
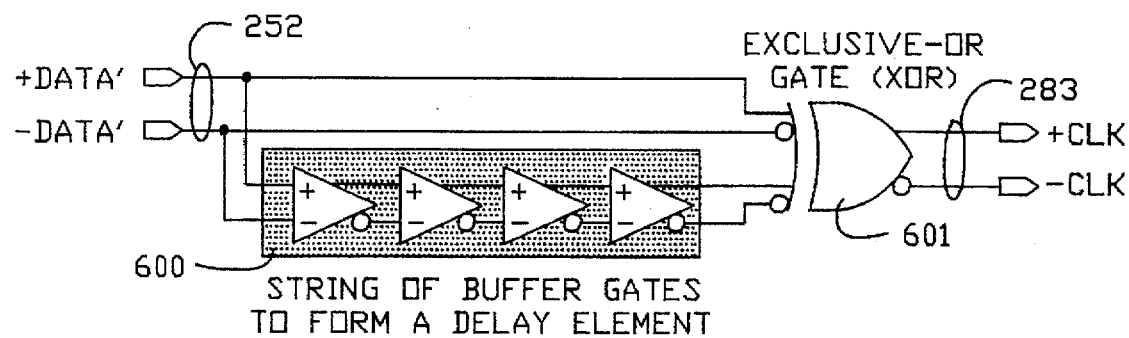
FIG. 16 is a schematic diagram of the edge detection circuit used in the embodiment of FIG. 14.

FIG. 16 illustrates one embodiment of an edge detector for use with the system of FIG. 14. The edge detector receives the differential data input on lines 252. A string 600 of buffer gates, four in the embodiment illustrated, form a delay element. The output of the string 600 of buffer gates is coupled to an exclusive OR gate 601. The other input to the exclusive OR gate 601 is the differential data signal on line 252. This produces a train of pulses on line 283. A more preferred system uses a circuit which triggers on first positive edge and does not retrigger until the following negative edge, such as a bounce-less switch.

Figure 17:
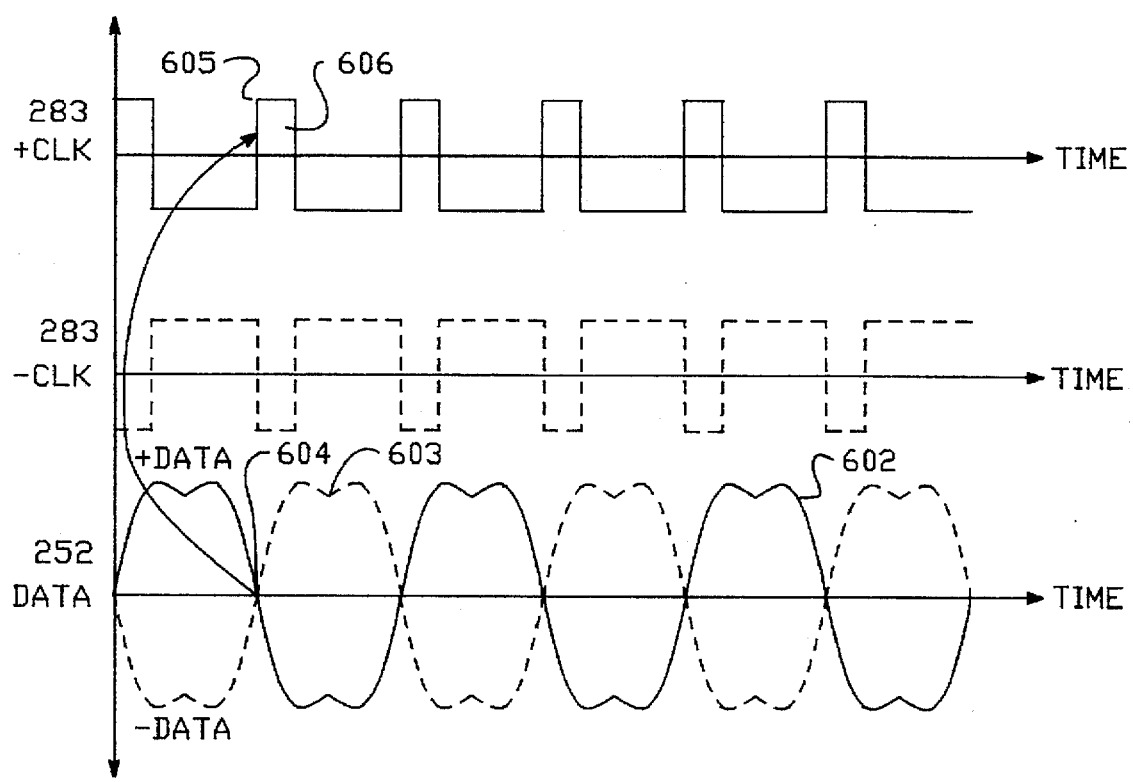
FIG. 17 is a timing diagram illustrating the edge detector outputs.

FIG. 17 illustrates the generation of the signal on lines 283 in response to an input data stream on lines 252 (trace 602). In the example shown, there is a transition for every clock period. It will be recognized that in an actual standard data stream, the actual number of transitions will vary widely. The differential data stream at trace 602 includes a positive data on trace 602 and the negative data on trace 603. The inputs to the exclusive OR gate 601 will become unequal during a data transition 604. Thus, the output of the exclusive OR gate 601 will pulse at edge 605. After the delay induced by delay element 600, the inputs to the exclusive OR gate 601 will become equal, causing a transition at line 606 back to a low clock. This pulse at transition 605 and transition 606 will occur for each transition in the input data stream as illustrated in FIG. 17.

Figure 18:
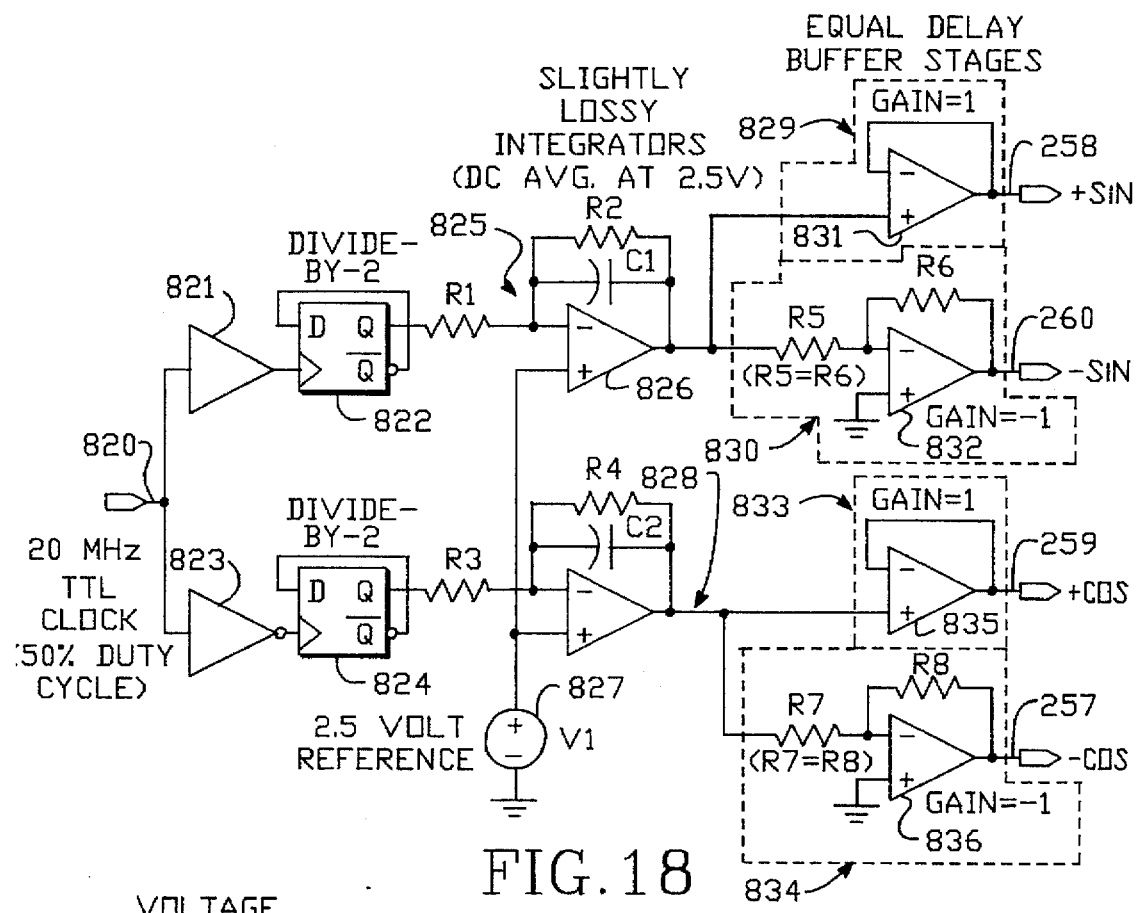
FIG. 18 is a schematic diagram of one embodiment of the triangle wave generator for use with the system of FIG. 14.
Figure 19:
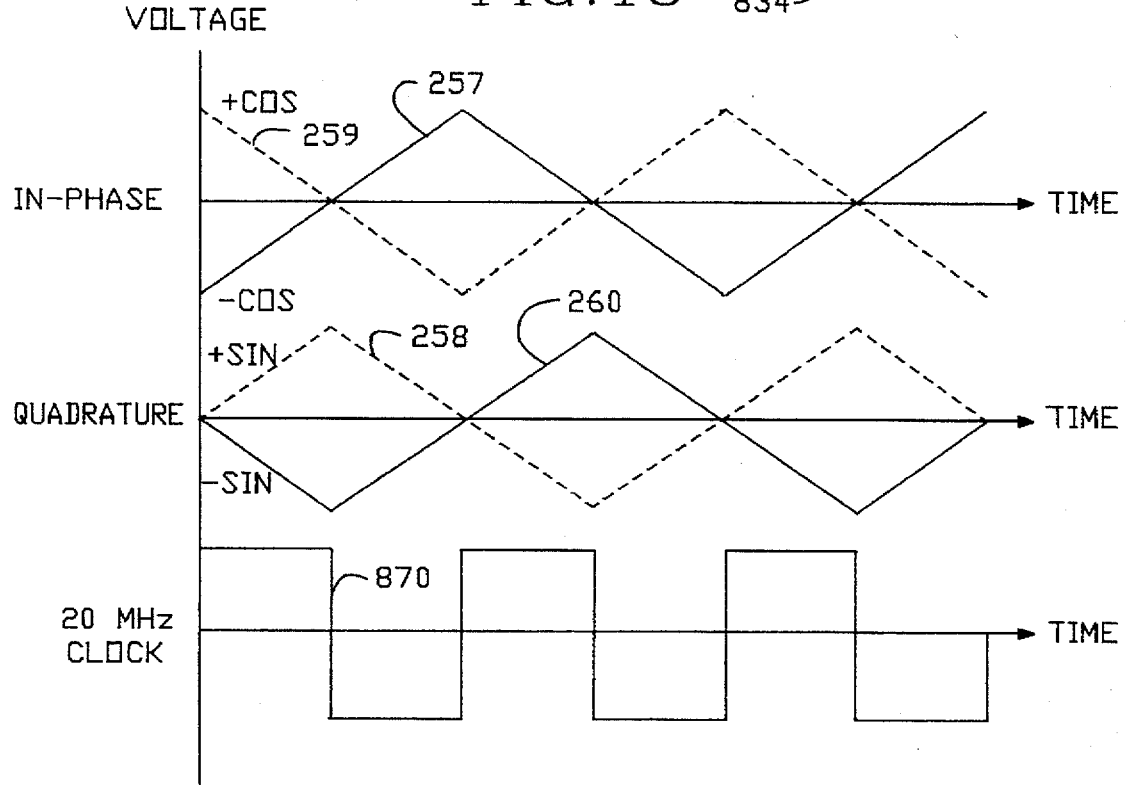
FIG. 19 is a timing diagram for the triangle wave generator of FIG. 18.

FIG. 18 illustrates one example of a triangle wave generator which could be used according to the present invention. It may be desirable to use sine wave generators for some applications. The triangle wave embodiment is illustrated with respect to FIG. 18. The input includes a 20 MHz TTL clock with a 50% duty cycle on line 820 as shown in FIG. 19 trace 870. This signal is supplied through a non-inverting buffer 821 to a divide-by-two register 822, and through an inverting buffer 823 to a divide-by-two register 824. The output of the divide-by-two register 822 is supplied through resistor R1 as input to a slightly lossy integrator, generally 825. The integrator 825 includes a differential amplifier 826 having a positive input coupled to a 2.5 volt reference 827, and an inverting input coupled to resistor R1. The differential amplifier 826 has a capacitor C1 and a resistor R2 in feedback from its output to its inverting input. Slightly lossy integrators allow the output to assume a DC average value, avoiding closed-loop integrator implementation.

Similarly, the output of the divide-by-two register 824 is coupled across resistor R3 to a slightly lossy integrator, generally 828, which is implemented using a similar structure as integrator 825.

The output of integrator 825 is supplied to buffer stages 829 and 830 to produce the positive and negative sine outputs (±SIN and ±COS are for reference only, outputs are really triangle waves). The positive sine output is supplied through a unity gain amplifier 831 having its inverting input connected to its output. The negative sine output is supplied through inverting amplifier 832 which has resistor R6 in feedback between its output and inverting input, resistor R5 between integrator 825 and the inverting input, and its positive input connected to ground. R6 and R5 are set equal to provide a unity inverting gain to the amplifier. Thus, the signals on lines 258 and 260 of FIG. 18 are produced as shown in FIG. 19.

In a similar fashion, the output of the integrator 828 is supplied to buffer stages 833 and 834. Buffer stage 833 is a unity gain amplifier 835. Buffer stage 834 is an inverting amplifier 836 configured as described above. These amplifiers produce the positive cosine and negative cosine outputs on lines 259 and 257, respectively, as shown in FIG. 19.

Figure 20:
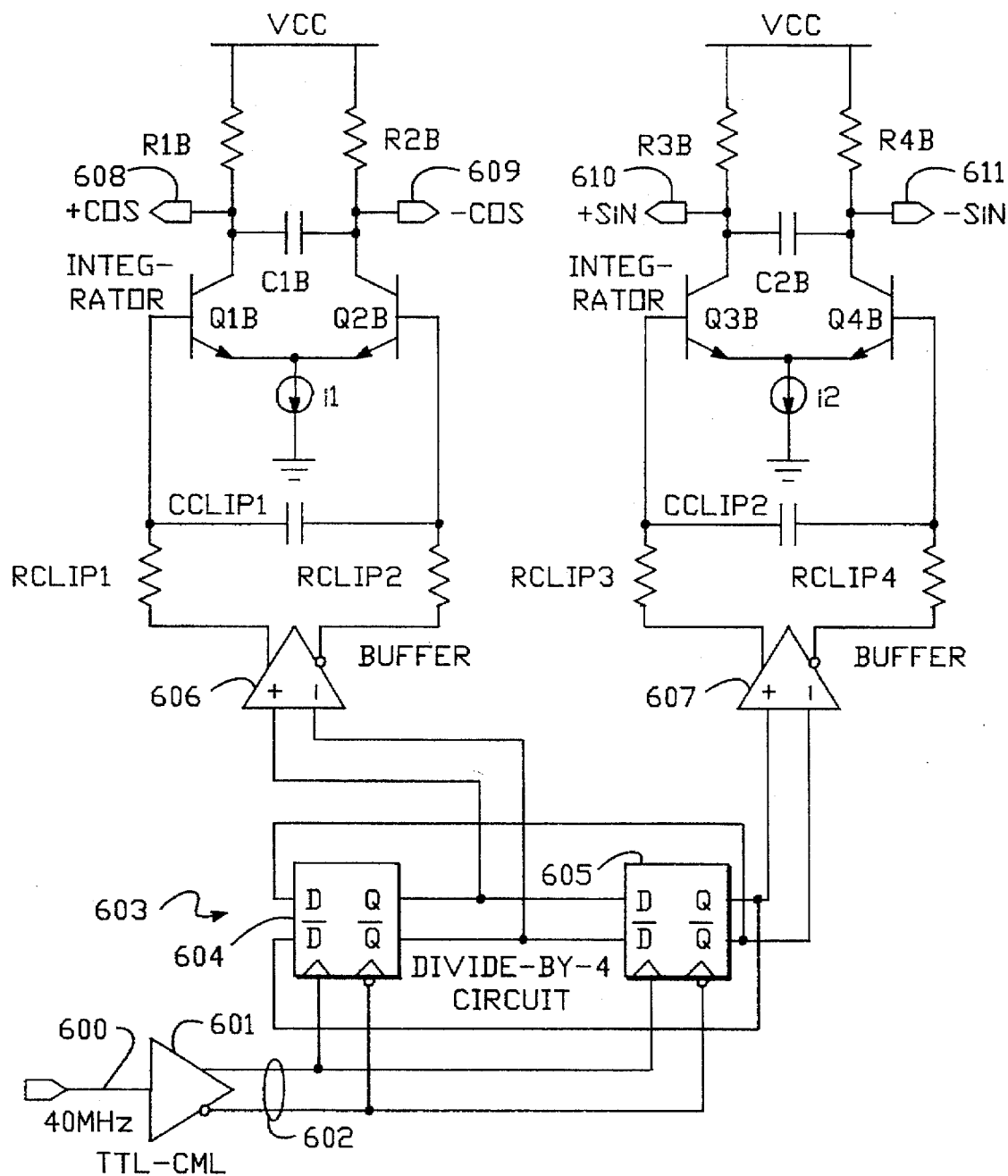
FIG. 20 is an electrical schematic diagram of a quadrature generator for use in an integrated circuit environment.

FIG. 20 provides a triangle wave generator adapted for integrated circuit technology. The circuit receives an input signal on line 600. This 40 MHz clock is supplied to a TTL-CML translator 601 which provides current mode logic signals on line 602. Lines 602 provide a clock for a divide by four circuit, generally 603, composed of a first flip-flop 604 and a second flip-flop 605. The D input to the first flip-flop 604 is provided at the Q bar output of the second flip-flop 605. The D bar input to flip-flop 604 is provided at the Q output of flip-flop 605. The Q output of flip-flop 604 is connected to the D input of flip-flop 605. The Q bar output of flip-flop 604 is connected to the D bar input of flip-flop of 605. The outputs of flip-flop 604 are connected to a buffer 606 which drives a first integrating circuit producing the plus and minus cosine signals. The outputs of flip-flop 605 are supplied through a buffer 607 which drives a second integrator producing the plus and minus sine signals. The positive output of buffer 606 is supplied through resistor RCLIP1 to the base of transistor Q1B. The negative output of buffer 606 is supplied through resistor RCLIP2 to the base of transistor Q2B. The emitters of transistors Q1B and Q2B are connected to current source I1. Also, the bases of transistors Q1B and Q2B are coupled by capacitor CCLIP1.

The collector of transistor Q1B is connected through resistor R1B to the supply VCC. The collector of transistor Q2B is connected through resistor R2B to the supply VCC. A capacitor C1B is connected between the collectors of transistors Q1B and Q2B. The +COS signal is supplied on line 608. The -COS signal is supplied on line 609.

The integrator which produces the plus and minus sine signals on lines 610 and 611 has an identical structure not redescribed here, except that it is driven 90° out of phase by buffer 607. The circuit of FIG. 20 is well suited to integrated circuit implementation.

Figure 21:
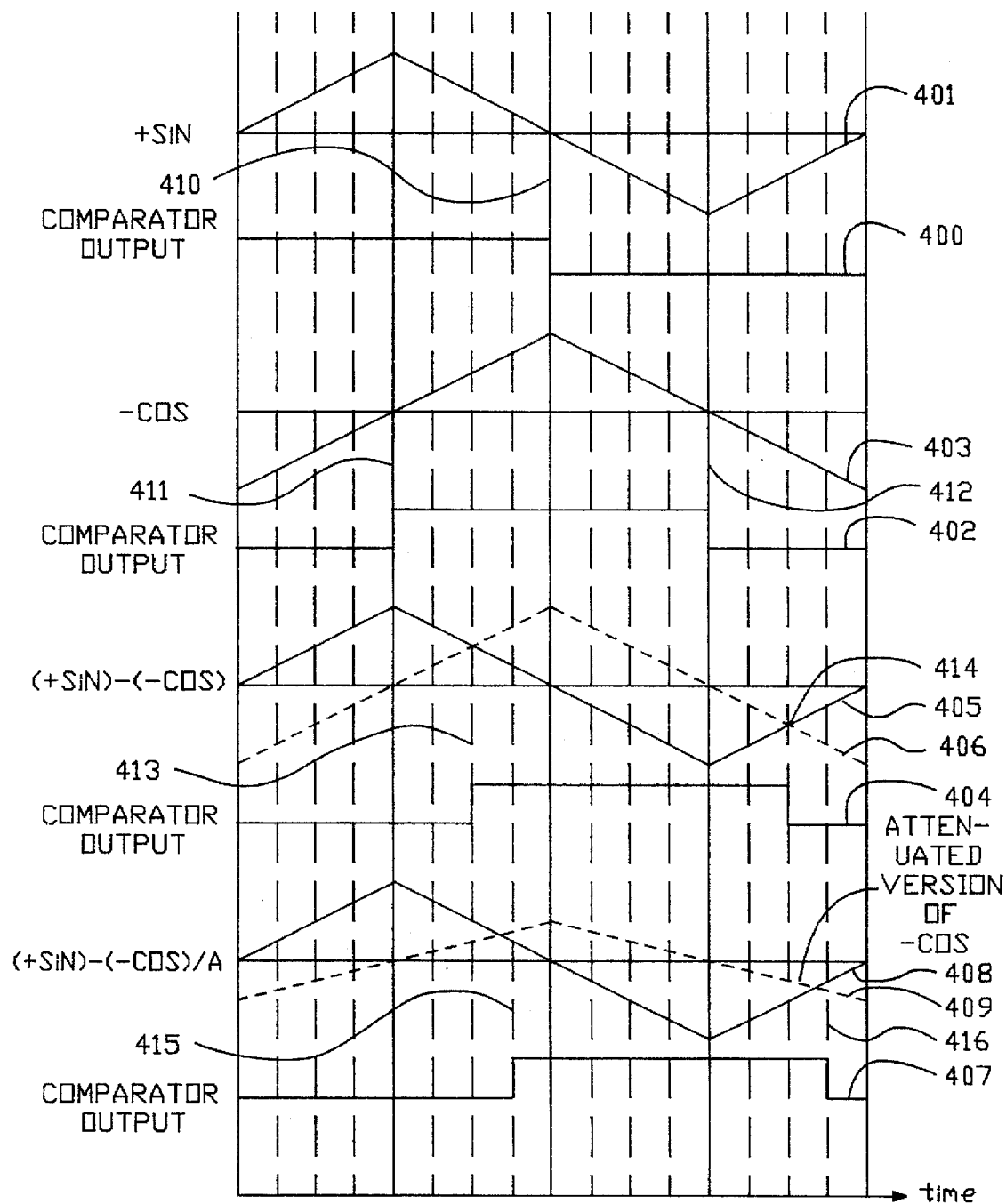
FIG. 21 is a timing diagram illustrating the triangle wave generator output and the outputs of the clock signal drivers.

FIG. 21 is a timing diagram illustrating the method of obtaining different clock phases by using weighted versions of triangle waveforms. In FIG. 21, four representative clock buffer 62-X outputs are shown, including a reference clock at trace 400 which may correspond, for instance, the output of buffer 62-2 for a given time relative to the plus sine (+SIN) trace 401. A second buffer output on trace 402 is provided which is representative, for instance, of the output of buffer 62-6 in reference to the minus cosine (-COS) trace 403. Trace 404 is representative, for instance, of the output comparator 62-4 which is produced in response to the (+SIN) and (-COS) signals as illustrated at traces 405 and 406. Also, FIG. 21 illustrates the output of a comparator 62-7 on trace 407. This signal is generated in response to comparison of the (+SIN) minus (-COS)/A computation, as illustrated with respect to traces 408 and 409. As can be seen, the comparator outputs 400, 402, 404 and 407 represent clock signals shifted in phase by one sixteenth cycle.

The buffer output 400 is a reference clock which has a transition when the sine signal intersects with ground at point 410. The second reference clock shown in FIG. 21 at trace 402 has transitions at 411 and 412 at which the minus cosine trace crosses zero. The third trace 404 has transitions when the plus sine and minus cosine signals intersect at points 413 and 414. The final trace 407 shown in FIG. 21 has transitions when the plus sine and an attenuated version of minus cosine intersect at points 415 and 416.

Thus, with reference to FIG. 14, eight reference clock signals, 79-0 through 79-7, are produced, shifted in phase by one sixteenth cycle each. These eight reference clock signals can be inverted to produce sixteen signals, one for each sixteenth of a cycle of the quadrature wave generator 56.

Figures 22, 23:
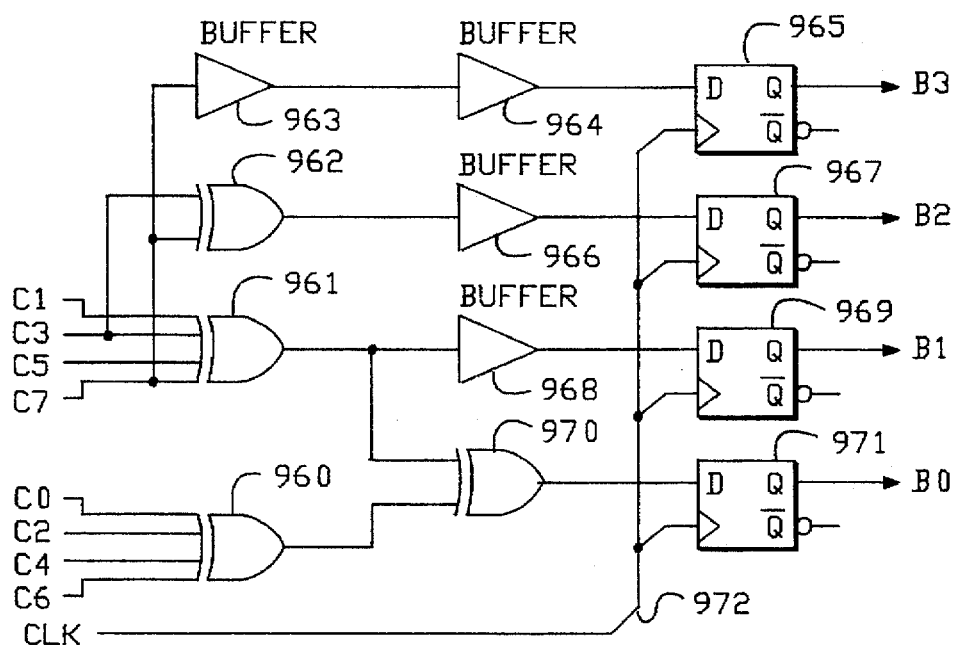
FIG. 22 is a decoding logic table for the decode logic of the system of FIG. 14.
FIG. 23 is a logic diagram for a decoder implementing the decoding logic table of FIG. 22.

The implementation of the decoder 284 of FIG. 14 is illustrated in FIGS. 22 and 23. FIG. 22 illustrates the logic table executed by the decoder. This logic table is believed self-explanatory where the inputs include C0 through C7 corresponding to the outputs of latching comparators 282-0 through 282-7. The outputs B0 through B3 correspond to the signals DECIDE(0:3) generated at the output of the decoding logic 284.

FIG. 23 illustrates one logic circuit implementation realizing the logic table of FIG. 22. Note that in FIG. 23, all data inputs are shown as single-ended even through differential logic is used throughout. The decoder can also be designed to be insensitive to metastable states of comparators. In this embodiment, signals C0, C2, C4, and C6 are supplied as inputs to exclusive OR gate 960. Signals C1, C3, C5, and C7 are supplied as inputs to exclusive OR gate 961. Signals C3 and C7 are supplied as inputs to exclusive OR gate 962. Signal C7 is supplied to buffer 963. The output of buffer 963 is supplied through buffer 964 to the data input of register 965. The output of exclusive OR gate 962 is supplied through buffer 966 to the data input of register 967. The output of exclusive OR gate 961 is supplied to buffer 968 to the data input of register 969. It is also supplied as input to exclusive OR gate 970. The second input to exclusive OR gate 970 is the output of exclusive OR gate 960. The output of exclusive OR gate 970 is supplied to the data input of register 971. Each of the registers 965, 967, 969, and 971 is clocked by the edge detection signal on line 972. The multi-input XOR gates 960 and 961 execute the function (C0 XOR C2 XOR C4 XOR C6) and (C1 XOR C3 XOR C5 XOR C7) respectively. A wide variety of other logic implementations for the decoder could be utilized. The logic decoder of FIG. 23 relies on "thermometer code" output of comparators, to achieve reduction of complexity, high speed, and low power consumption.

Figure 24:
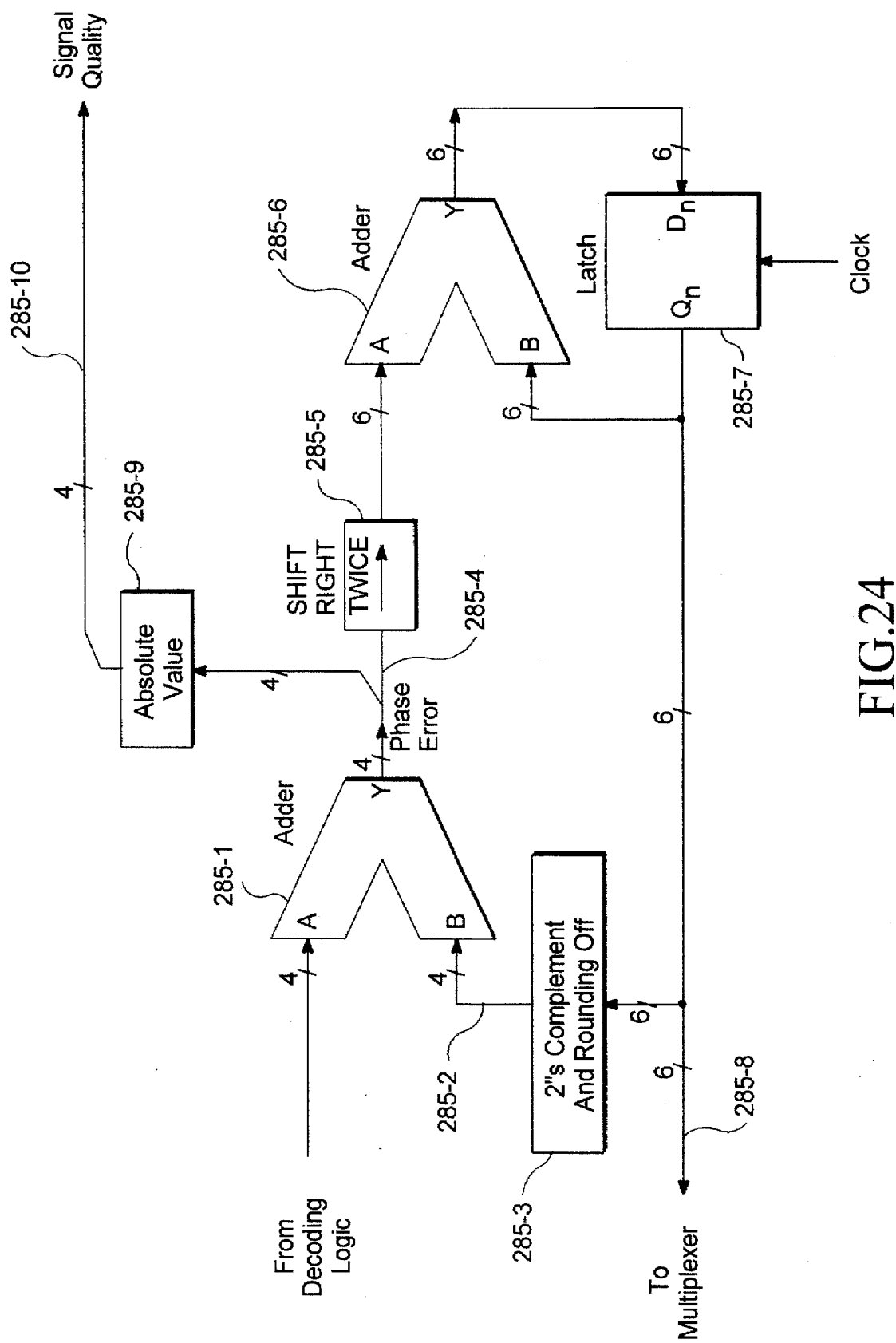
FIG. 24 is a diagram of a recursive digital filter for use with the clock recovery and phase monitoring circuit of FIG. 14.

FIG. 24 shows a recursive digital filter for use with the circuit shown in FIG. 14A and utilized to minimize the effect of phase jitter in a received data stream. In FIG. 24, the complementary outputs DECODER (0:3) of the decoding logic 284 are supplied to the input of adder 285-1. The second input to the adder 285-1 is supplied on line 285-2 from the output of the 2's complement and the rounding off circuit 285-3, which receives its input as feedback from the filter loop. The output of the adder supplied on line 285-4 as a phase error signal to a dividing circuit 285-5, which operates by shifting the phase error signal to the right twice. The output of the dividing circuit 285-5 is connected to the input of a second adder 285-6. The second input to the adder 285-6 is supplied from the output of a latch 285-7 in feedback in the loop. The input of the latch 285-7 is supplied from the output of the adder 285-6.

Also, the output of the latch 285-7 is supplied as input the 2's complement and rounding off circuit 285-3 to complete the loop of the recursive filter. Furthermore, the output latch 285-7 is supplied on line 285-8 back to the multiplexer to control selection of the reference clock signal.

An absolute value for the phase error is sampled by the absolute value circuit 285-9 and provides a signal quality signal on line 285-10.

A variety of other digital filter designs could be used as suits the needs of a particular design, including higher order designs, such as a second order or third order recursive digital filter. Also, it may be desirable to widen the recursive filter to more than 4 bits to avoid truncation errors. Adaptation of the filter will be determined based on a particular environment using the invention.

The following tables illustrate recursive filter operation for a positive and a negative phase jump.

Positive Phase Jump

| Instantaneous Phase | Phase Error | Absolute Value of Error (Signal Quality) |
|---|---|---|
| 0000 | 0000 | 0000 |
| 0000 | 0000 | 0000 |
| 0000 | 0000 | 0000 |
| 0011 | 0011 | 0011 |
| 0011 | 0010 | 0010 |
| 0011 | 0010 | 0010 |
| 0011 | 0001 | 0001 |
| 0011 | 0001 | 0001 |
| 0011 | 0001 | 0001 |
| 0011 | 0000 | 0000 |
| 0011 | 0000 | 0000 |

Negative Phase Jump

| Instantaneous Phase | Phase Error | Absolute Value of Error (Signal Quality) |
|---|---|---|
| 0011 | 0000 | 0000 |
| 0011 | 0000 | 0000 |
| 0011 | 0000 | 0000 |
| 0000 | 1101 | 0011 |
| 0000 | 1110 | 0010 |
| 0000 | 1110 | 0010 |
| 0000 | 1111 | 0001 |
| 0000 | 1111 | 0001 |
| 0000 | 1111 | 0001 |
| 0000 | 0000 | 0000 |
| 0000 | 0000 | 0000 |

The absolute value of the phase error bits is used as a measure of how much jitter/phase error there is in the recovered data/clock. When the instantaneous phase does not change, the phase error remains at 0000 (binary 0). When the instantaneous phase jumps to a new value (shown as a step-change in phase in the above two examples), then the recursive filter takes a few clock cycles to "catchup" to the new phase angle. During this "catch-up" period, the phase error slowly returns to zero. In the case of a negative phase jump, the phase error starts out below zero (in two's complement arithmetic a "1" on the MSB indicates a negative number) and slowly returns to zero. If the MSB is "1" then the two's complement of the binary number (that is, invert all bits and add on to the result) is used to get its absolute value.

In addition to a phase jump, a "noisy" data input signal could result in the phase error bits constantly changing.

As mentioned above, the communications channel according to the present invention comprises a wireless link in a local area network, such as an Ethernet network. Thus, for instance, a packet format for a wireless packet according to the present invention is shown in FIG. 25. The packet includes a wireless header 1000, a standard Ethernet packet, generally 1001, with the standard CRC-32 cyclic redundancy code 1002 appended therein. In addition, according to the present invention, a wireless CRC code 1003 is appended to the entire package, which is developed over the wireless header 1000, the Ethernet packet 1001 and the Ethernet CRC 1002.

A CRC generator used in one embodiment of the present invention is shown in FIG. 26. The CRC generator in FIG. 26 comprises a 16 stage shift register 1010, including stages $r_0$ through $r_{15}$. A control line 1017 is used to supply a signal which gates the CRC generator to operate on the appropriate parts of the packet. The output of stage $r_4$ is supplied as a first input to exclusive OR gate 1011. Likewise, the output of stage $r_{11}$ is supplied as one input to exclusive OR gate 1012. The output of stage $r_{15}$ is supplied as an input to inverter 1013, and fed back as one input to exclusive OR gate 1014. A second input to exclusive OR gate 1014 is the input data stream on line 1015. The output of exclusive OR gate 1014 is supplied to AND gate 1016. A control signal on line 1017 enables the AND gate 1016. The output of AND gate 1016 is the second input for exclusive OR gates 1011 and 1012.

The output data stream is applied on line 1020 at the output of OR gate 1021. The input of OR gate 1021 is applied from the output of AND gate 1022 and from the output of AND gate 1023. The control signal on line 1017 is applied as one input to AND gate 1023 and through inverter 1024 as one input of AND gate 1022. Thus, the control signal 1017 causes the logic structure based on gates 1021 through 1024 to output the input data stream from line 1015 onto line 1020 during the first part of the packet. Also, the control signal enables the shift register 1010 to generate a 16 bit CRC code. At the end of the packet, the control signal on line 1017 is turned low. This disables the input data stream gate 1023 and enables the gate 1022. Thus, the output of inverter 1013 is applied through AND gate 1022 and OR gate 1021 to the output data line 1020. This applies a 16 bit CRC code to the packet.

The formula used to generate the CRC code may be represented by the polynomial which follows:

$$X^{16}+X^{12}+X^5+1$$

As mentioned above, the receiver and transmitter include data whitening circuits which scramble the data packet to remove the DC component from the transmitted frame, and to recover the unscrambled data from the receive data stream.

Figure 27:
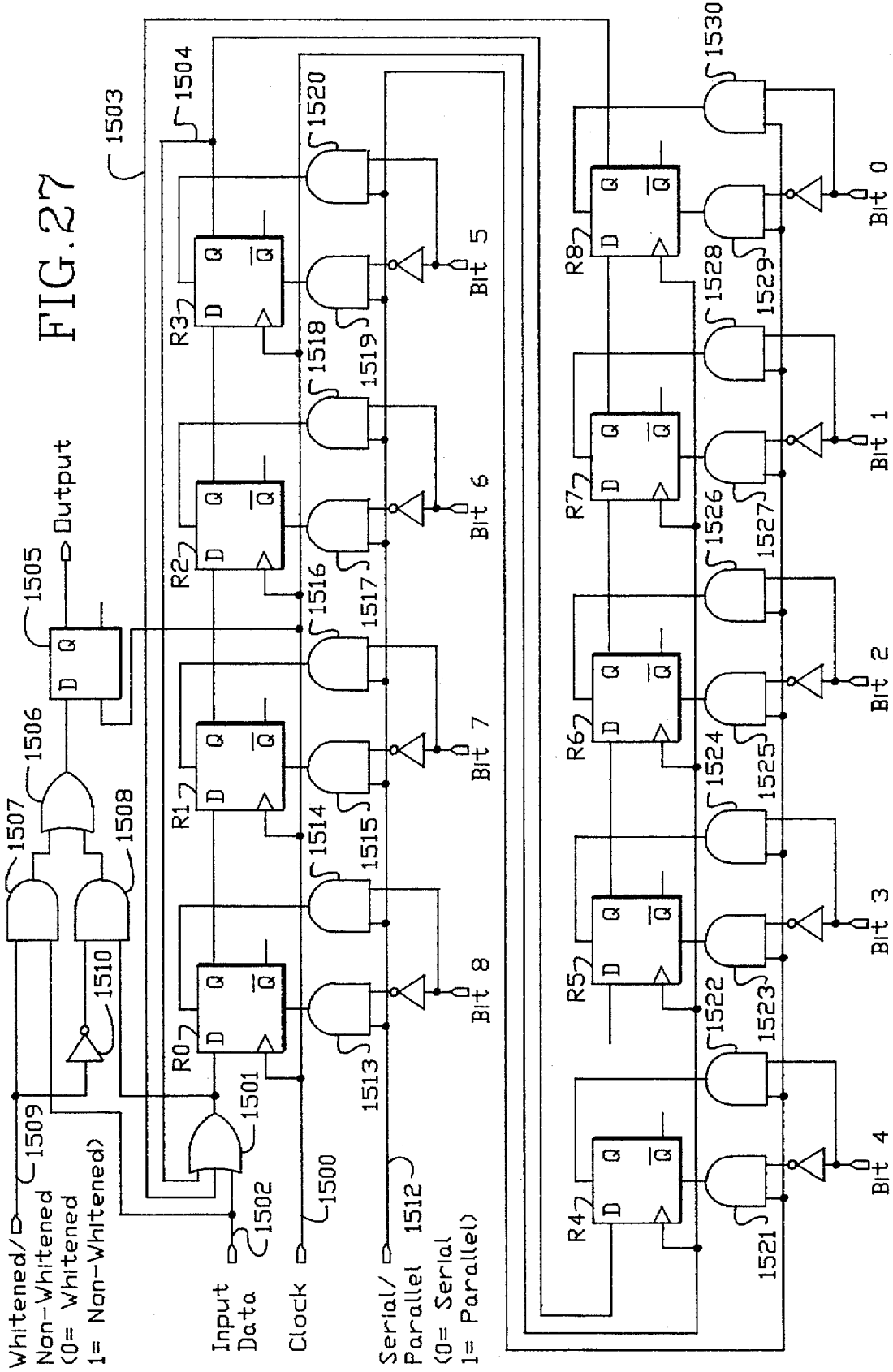
FIG. 27 illustrates a data whitener used with the transmitter of the present invention.

FIG. 27 illustrates the data whitening circuit according to the present invention. The whitening circuit is based on a sequence of "D" flip-flops R0 through R8. These flip-flops are connected in series with the Q output of stage R0 connected to the D-input of stage R1 and so on. Similarly, the flip-flops are clocked by the clock signal on line 1500. The input to the flip-flop stage R0 is supplied at the output of the multiple input exclusive Or gate 1501. Exclusive Or gate 1501 receives as input the data on line 1502, the output of stage R8 on line 1503, and the output of stage R3 on line 1504. The output of the whitening circuit is supplied through flip-flop 1505. The input to flip-flop 1505 is generated at Or gate 1506. The inputs to Or gate 1506 include the output of And gate 1507 and the output of And gate 1508. The inputs to And gate 1507 include the data on line 1502, and a gate signal on line 1509 which turns on and off the whitening function. The inputs to the And gate 1508 include the inverse of the gate signal generated by inverter 1510, and the output of exclusive Or gate 1501. When the gate signal on line 1509 is high, then unwhitened data is passed through And gate 1507 to the output. During this state, the And gate 1508 is disabled. When the gate signal on line 1509 is low, And gate 1508 is enabled, and the whitened output from the output of exclusive Or gate 1501 is supplied to the flip-flop 1505.

The whitening circuit is initialized by a parallel write mode for the sequence of flip-flops R0 through R8. This mode is selected by control signal on line 1512. The signal on line 1512 is connected to the inputs of the series of gates 1513 through 1530. When in a parallel mode, data supplied on lines BIT0 through BIT8 are coupled into the flip-flops. In the serial mode, data from the input data line 1502 is supplied in series through the circuit. The data is supplied into the flip-flops using the set/reset functionality. Thus, for a particular stage, such as stage R1 And gates 1515 and 1516 have outputs connected to the reset and set terminals on the flip-flop R1. When the data bit 7 is high, this enables the set input to flip-flop R1. When the data bit 7 is low, this enables the reset input to flip-flop R1. The similar functions provided by the other circuitry shown in the figure. In a preferred system, the whitener is initialized with a pseudorandom number BIT0–BIT8 which can be changed during retry sequences.

Figure 28:
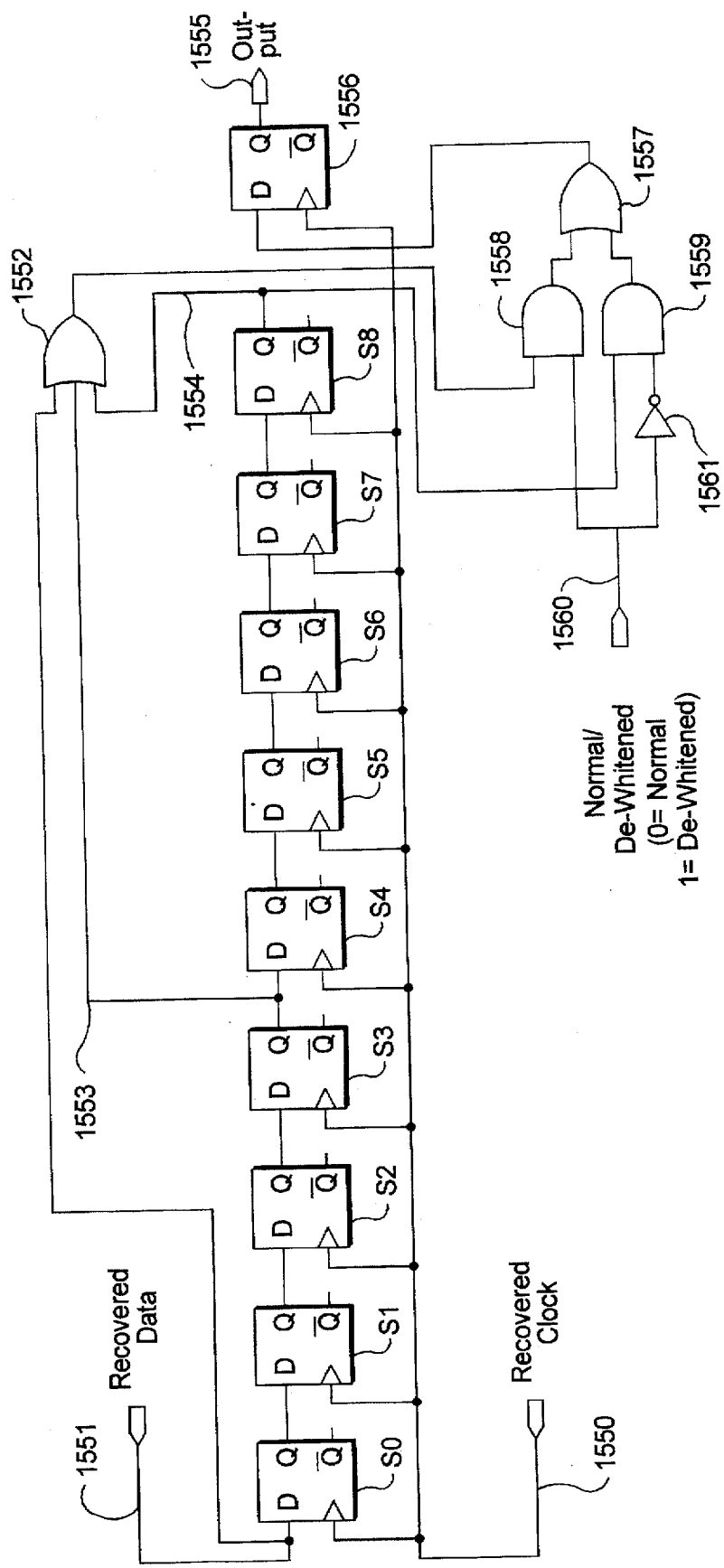
FIG. 28 illustrates a data dewhitener for the whitener of FIG. 27 used according to the present invention.

FIG. 28 illustrates the data dewhitening circuitry which is complementary to the whitening circuit of FIG. 27. This circuitry consists of a sequence of flip-flops S0 through S8. Flip-flops S0 through S8 are connected in series, where the Q output of stage S0 is connected to the D input of stage S1 and so on. The recovered clock signal on line 1550 is used for clocking the sequence of flip-flops S0 through S8. The recovered data on line 1551 is supplied as input to stage S0. The dewhitened data is generated at the output of exclusive Or gate 1552 which receives the recovered data on line 1551 as input, the output of stage S3 on line 1553 as input, and the output of stage S8 on line 1554 as input. The output of the dewhitening circuitry is generated on line 1555 at the output of flip-flop 1556. Flip-flop 1556 is clocked by the recovered clock on line 1550, and has its D input connected to the output of Or gate 1557. The inputs to Or gate 1557 include the output of the And gate 1558 and the output of And gate 1559. The inputs to And gate 1558 include the output of exclusive Or gate 1552, and a control signal on line 1560. Similarly, the inputs to And gate 1559 include the inverse of the control signal generated by inverter 1561, and the signal at the output of stage S8 on line 1558. When the control signal on line 1560 is low, then gate 1559 is enabled allowing direct passthrough of the recovered data to the output 1555. When the gate signal on line 1560 is high, then the dewhitened data from the output of exclusive Or gate 1552 is passed through the logic to the output 1555.

The data whitener technique ensures a larger number of transitions in a given data packet, assisting in clock recovery, and providing a larger number of transitions which can be monitored for the purposes of error detection as mentioned above.

In sum, the present invention provides a system for detecting errors in a wireless link of a local area network. The error detection is provided in three phases. In the first phase, a wireless CRC or other error detection code or frame check sequence is appended to the packet to be transmitted across the wireless link. The receiving station recalculates the CRC to validate correct reception of the packet. This type of error detection is very good for detecting single bit errors, and will catch some multiple bit errors. However, for bursty error sources, such as jammers or other interferences which might be encountered in a wireless environment, the wireless CRC may not be sufficient. Also, the error detection provided by the wireless CRC comes at the end of the packet, which induces some delay in detecting that bad data has been transmitted.

Thus, according to the present invention, two other techniques are applied for detecting errors, one based on monitoring the amplitude of a received signal for anomalies, and another based on monitoring the phase of transitions in the received signal for anomalies. Many sources of interference and jamming in a wireless system will cause the amplitude of the received signal to fluctuate, and/or the phase of the received signal to fluctuate. Thus, by monitoring these two characteristics of the received signal, erroneous data packets can be detected. Further, these detections can occur earlier in the frame than is provided by CRC detection alone. This improves performance by detecting errors earlier in the transmission, allowing for a quicker retry.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An apparatus for detecting errors in a wireless communication channel, comprising:

a receiver which receives a data stream from the wireless communication channel;

a signal strength indication circuit coupled with the receiver which indicates signal strength for a received data stream; and processing resources, coupled with the signal strength indication circuit, which monitor the received data stream signal strength to detect anomalies in strength of the received data stream typical of erroneous data, and produce a receive data error signal in response to detected anomaly in strength.

2. The apparatus of claim 1, further including a signal phase monitoring circuit coupled with the receiver which indicates phase of a received data stream; and processing resources, coupled with the signal phase monitoring circuit, which monitor the received data stream phase to detect anomalies in phase of the received data stream typical of erroneous data, and produce a receive data error signal in response to detected anomaly in phase.

3. The apparatus of claim 2, wherein the data stream includes data packets having error detection codes embedded in the data packets, and further including:

processing resources coupled with the receiver responsive to the error detection codes to detect errors in the data packets.

4. The apparatus of claim 1, wherein the receiver includes:

an antenna which receives RF energy in a communication band;

a downconverter, coupled with the antenna, which converts the received data stream frequency down to a intermediate band;

a filter, coupled to the downconverter, tuned for the intermediate band which outputs an intermediate band signal; and a detector, coupled to the filter, which produces recovered data from the intermediate band signal.

5. The apparatus of claim 4, wherein the signal strength indication circuit is coupled to the filter, and produces a signal strength indicator signal in response to the intermediate band signal strength.

6. The apparatus of claim 5, wherein the signal strength indication signal comprises a voltage which is logarithmically proportional to amplitude of the intermediate band signal.

7. The apparatus of claim 6, wherein the RF energy in the communication band comprises a frequency modulated signal.

8. The apparatus of claim 4, wherein the filter comprises a surface acoustic wave (SAW) filter.

9. The apparatus of claim 1, wherein the receiver includes:

an antenna which receives RF energy in a communication band;

a downconverter, coupled with the antenna, which converts the received RF energy frequency down to a intermediate band;

a filter, coupled to the downconverter, tuned for the intermediate band which outputs an intermediate band signal;

a detector, coupled to the filter, which produces an incoming data stream from the intermediate band signal;

phase detection circuitry coupled to the detector which indicates phase of the incoming data stream; and processing resources, coupled with the phase detection circuitry, which monitors phase of the incoming data stream to detect anomalies in phase of the incoming data stream typical of erroneous data, and produce a receive data error signal in response to a detected anomaly in phase.

10. The apparatus of claim 9, wherein the signal strength indication circuit is coupled to the filter, and produces a signal strength indicator signal in response to the intermediate band signal strength.

11. The apparatus of claim 10, wherein the incoming data stream includes data packets having error detection codes embedded in the data packets, and further including:

processing resources coupled with the detector responsive to the error detection codes to detect errors in the data packets.

12. An apparatus for detecting errors in a network data packet transmitted in a wireless radio medium as an RF signal modulated in response to the network data packet, comprising:

a receiver which receives the RF signal from the wireless radio medium;

a demodulation circuitry which demodulates the RF signal to recover a serial data stream from the RF signal;

a signal strength indication circuit, coupled with the demodulation circuitry, which indicates signal strength for a received RF signal; and processing resources, coupled with the signal strength indication circuit, which monitor the received signal strength of the RF signal to detect anomalies in strength of the RF signal typical of erroneous data in the serial data stream, and produce a receive data error signal in response to detected a anomaly in strength.

13. The apparatus of claim 12, further including:

a signal phase monitoring circuit coupled with the demodulation circuitry which indicates phase of transitions in the serial data stream; and processing resources, coupled with the signal phase monitoring circuit, which monitor the received data stream phase to detect anomalies in phase of the received data stream typical of erroneous data, and produce a receive data error signal in response to a detected anomaly in phase.

14. The apparatus of claim 13, wherein the network data packets having error detection codes embedded in the data packets, and further including:

processing resources coupled with the demodulation circuitry responsive to the error detection codes to detect errors in the data packets.

15. The apparatus of claim 12, wherein the demodulation circuitry includes:

an antenna which receives the RF signal having a frequency in a communication band;

a downconverter, coupled with the antenna, which converts the frequency of the RF signal down to an intermediate band;

a filter, coupled to the downconverter, tuned for the intermediate band which outputs an intermediate band signal; and a detector, coupled to the filter, which produces the serial data stream from the intermediate band signal.

16. The apparatus of claim 15, wherein the signal strength indication circuit is coupled to the filter, and produces a signal strength indicator signal in response to amplitude of the intermediate band signal.

17. The apparatus of claim 12, wherein the receiver includes:

an antenna which receives the RF signal in a communication band;

a downconverter, coupled with the antenna, which converts the received RF signal down from the communication band to an intermediate band;

a filter, coupled to the downconverter, tuned for the intermediate band which outputs an intermediate band signal;

a detector, coupled to the filter, which produces the received data stream from the intermediate band signal;

phase detection circuitry coupled to the detector which indicates phase of transitions in the received data stream; and processing resources, coupled with the phase detection circuitry, which monitors phase of the received data stream to detect anomalies in phase of the received data stream typical of erroneous data, and produce a receive data error signal in response to detected anomaly in phase.

18. The apparatus of claim 17, wherein the signal strength indication circuit is coupled to the filter, and produces a signal strength indicator signal in response to the intermediate band signal amplitude.

19. The apparatus of claim 17, wherein the filter comprises a surface acoustic wave (SAW) filter.

20. The apparatus of claim 17, wherein the signal strength indication signal comprises a voltage which is logarithmically proportional to amplitude of the intermediate band signal.

21. The apparatus of claim 17, wherein the RF signal comprises a frequency modulated signal modulated by gaussian filtered minimum shift keying.

22. An apparatus for detecting errors in a network data packet transmitted in a wireless radio medium as a frequency modulated RF signal modulated in response to the network data packet with a data rate of greater than one megabit per second, comprising:

an antenna which receives the RF signal in a microwave communication band;

a radio frequency (RF) amplifier tuned to the microwave communication band which receives the RF signal from the wireless radio medium;

a downconverter, coupled with the RF amplifier, which converts the received RF signal from the communication band down to an intermediate band;

a filter, coupled to the downconverter, tuned for the intermediate band which outputs an intermediate band signal; and a detector, coupled to the filter, which produces a serial data stream from the intermediate band signal;

a signal strength indication circuit, coupled with the filter, which indicates signal strength for the intermediate band signal;

a signal phase monitoring circuit coupled with the detector which indicates phase of transitions in the serial data stream; and processing resources, coupled with the signal strength indication circuit, which monitor the signal strength of the intermediate band signal and phase of transitions in the serial data stream to detect anomalies typical of erroneous data in the serial data stream, and produce a receive data error signal in response to a detected anomaly in strength or a detected anomaly in phase.

23. The apparatus of claim 22, wherein the serial data stream comprises analog non-return-to-zero (NRZ) data.

24. The apparatus of claim 23 wherein the analog NRZ data has a data rate of nominally 10 megabits per second.

25. The apparatus of claim 24, wherein the network data packets comprise an Ethernet packet, encapsulated in a wireless packet, the wireless packet having an error detection code, and further including:

processing resources coupled with the detector responsive to the error detection code to detect errors in the Ethernet data packets.

26. The apparatus of claim 22, wherein the filter comprises a surface acoustic wave (SAW) filter.

27. The apparatus of claim 26, wherein the signal strength indication circuit produces a signal comprising a voltage which is logarithmically proportional to amplitude of the intermediate band signal.

28. The apparatus of claim 22, wherein the frequency modulated RF signal is modulated by gaussian filtered minimum shift keying.

* * * * *